US011129357B1

United States Patent
Lee et al.

(10) Patent No.: US 11,129,357 B1
(45) Date of Patent: Sep. 28, 2021

(54) ANIMAL BEDDING

(71) Applicant: LeapHigh Animals LLC, Las Vegas, NV (US)

(72) Inventors: Si Hyung Lee, Las Vegas, NV (US); Sean Sangil Hahn, Las Vegas, NV (US)

(73) Assignee: LeapHigh Animals LLC, Las Vegas, NV (US)

( * ) Notice: Subject to any disclaimer, the term of this patent is extended or adjusted under 35 U.S.C. 154(b) by 0 days.

(21) Appl. No.: 17/222,446

(22) Filed: Apr. 5, 2021

Related U.S. Application Data

(63) Continuation-in-part of application No. 15/906,727, filed on Feb. 27, 2018, now Pat. No. 10,966,405.

(51) Int. Cl.
*A01K 1/01* (2006.01)
*B32B 7/09* (2019.01)
(Continued)

(52) U.S. Cl.
CPC ............ *A01K 1/0157* (2013.01); *B32B 5/024* (2013.01); *B32B 5/026* (2013.01); *B32B 5/08* (2013.01); *B32B 5/26* (2013.01); *B32B 7/09* (2019.01); *B32B 27/12* (2013.01); *B32B 27/40* (2013.01); *B32B 2250/03* (2013.01); *B32B 2250/04* (2013.01); *B32B 2255/02* (2013.01); *B32B 2255/26* (2013.01); *B32B 2262/0253* (2013.01); *B32B 2262/0269* (2013.01); *B32B 2262/0276* (2013.01); *B32B 2262/065* (2013.01);
(Continued)

(58) Field of Classification Search
CPC .. A01K 1/0353; A01K 1/0107; A01K 1/0157; A01K 1/0158; A01K 1/0236; A47G 9/02; B32B 27/12; B32B 3/26; B32B 5/26; B32B 27/40; B32B 5/024; B32B 5/026; B32B 5/08; B32B 7/09
USPC ........... 119/28.5, 169, 482, 161, 171; 5/485, 5/420, 484, 500
See application file for complete search history.

(56) References Cited

U.S. PATENT DOCUMENTS

| 2,775,222 | A | * | 12/1956 | Kruck | .................. | A01K 1/0353 |
| | | | | | | 119/482 |
| D219,743 | S | * | 1/1971 | Murray | ........................ | D30/118 |

(Continued)

OTHER PUBLICATIONS

Cozy and Clean, https://www.etsy.com/shop/CozyandClean {dated Aug. 23, 2017 from the Wayback Machine), Date Accessed: May 11, 2018 (9 pages).

(Continued)

*Primary Examiner* — Yvonne R Abbott-Lewis
(74) *Attorney, Agent, or Firm* — Lempia Summerfield Katz LLC

(57) ABSTRACT

Animal bedding, such as for a guinea pig, is disclosed. The animal bedding comprises a main section and a pocket. The main section includes a top layer, a middle layer, and a bottom layer. The top layer is hydrophobic, the middle layer is hydrophilic and at least a part of the bottom layer is hydrophobic. The top layer, the middle layer and the bottom layer are attached to one another, such as via stitching along a perimeter of the main section. Separately, the top layer and the middle layer are attached to one another, such as in an interior of the main section, to form quilting in the main section. The pocket, which is attached to the main section, allows the guinea pig to burrow therein.

35 Claims, 25 Drawing Sheets

(51) Int. Cl.
*A01K 1/015* (2006.01)
*B32B 5/02* (2006.01)
*B32B 5/08* (2006.01)
*B32B 5/26* (2006.01)
*B32B 27/12* (2006.01)
*B32B 27/40* (2006.01)

(52) U.S. Cl.
CPC ..... *B32B 2262/14* (2013.01); *B32B 2307/718* (2013.01); *B32B 2307/728* (2013.01); *B32B 2307/7265* (2013.01); *B32B 2307/73* (2013.01); *B32B 2307/732* (2013.01)

(56) References Cited

U.S. PATENT DOCUMENTS

| | | | | |
|---|---|---|---|---|
| 3,842,454 | A * | 10/1974 | Young | A47G 9/086 |
| | | | | 5/413 R |
| 4,893,586 | A * | 1/1990 | Carson | A01K 1/0353 |
| | | | | 119/482 |
| 5,010,843 | A * | 4/1991 | Henry | A01K 1/0353 |
| | | | | 119/28.5 |
| 5,099,530 | A * | 3/1992 | Scott | A47G 9/02 |
| | | | | 5/419 |
| 5,119,763 | A * | 6/1992 | Crabtree | A01K 1/0353 |
| | | | | 119/28.5 |
| 5,357,901 | A * | 10/1994 | Batts | A01K 1/0353 |
| | | | | 119/28.5 |
| 5,630,376 | A * | 5/1997 | Ochi | A01K 1/0107 |
| | | | | 119/169 |
| 5,685,257 | A * | 11/1997 | Feibus | A01K 1/0353 |
| | | | | 119/28.5 |
| D390,686 | S * | 2/1998 | Grabowski | 5/413 R |
| 5,749,314 | A * | 5/1998 | Pelham | A01K 1/0353 |
| | | | | 119/28.5 |
| 6,173,675 | B1 * | 1/2001 | Licciardo | A01K 1/0353 |
| | | | | 119/28.5 |
| 6,378,456 | B1 * | 4/2002 | Jerome | A01K 1/0353 |
| | | | | 119/28.5 |
| D467,042 | S * | 12/2002 | Peterson | D30/118 |
| D469,585 | S * | 1/2003 | LaCroix | D30/118 |
| 6,804,978 | B2 | 10/2004 | Kost | |
| 6,818,571 | B1 | 11/2004 | Pintz et al. | |
| D523,192 | S | 6/2006 | Northrop | |
| 7,117,899 | B1 | 10/2006 | Kim | |
| 7,231,888 | B1 * | 6/2007 | Kelly | A01K 1/0353 |
| | | | | 119/161 |
| D641,936 | S | 7/2011 | Simpson | |
| 8,101,815 | B2 * | 1/2012 | Kaneko | A01K 1/0107 |
| | | | | 604/383 |
| 8,388,589 | B2 * | 3/2013 | Kaneko | A01K 1/0157 |
| | | | | 604/385.01 |
| D744,263 | S * | 12/2015 | Quinones | D6/603 |
| D765,922 | S | 9/2016 | Savan | |
| D799,759 | S | 10/2017 | Elliott | |
| D830,735 | S | 10/2018 | Johnson | |
| D831,898 | S * | 10/2018 | Gerke | D30/118 |
| 10,273,608 | B2 | 4/2019 | Chiu | |
| D869,880 | S * | 12/2019 | Ruiz | D6/606 |
| D875,428 | S | 2/2020 | Lin | |
| D878,685 | S | 3/2020 | Xu | |
| 10,834,892 | B2 * | 11/2020 | Chen | A01K 1/0157 |
| 2004/0216328 | A1 | 11/2004 | LaDuca | |
| 2008/0236504 | A1 * | 10/2008 | Silverman | A01K 1/0107 |
| | | | | 119/169 |
| 2011/0192419 | A1 * | 8/2011 | Davis | B32B 25/045 |
| | | | | 134/6 |
| 2014/0259405 | A1 * | 9/2014 | Lacasse | A47G 9/0284 |
| | | | | 5/485 |
| 2018/0049400 | A1 * | 2/2018 | Hills | A61D 9/00 |
| 2019/0014918 | A1 * | 1/2019 | Markowitz | B32B 5/245 |
| 2019/0021277 | A1 * | 1/2019 | Godfrey | A01K 1/0353 |
| 2019/0174892 | A1 * | 6/2019 | Chen | B32B 5/18 |

OTHER PUBLICATIONS

Kelli's Crafts & More, https://www.etsy/com/shop/Kelliscraftsandmore (dated Jun. 9, 2016 from the Wayback Machine), Date Accessed: May 11, 2018 (17 pages).
Pradeep Composites: K. Effect Kushwaha of et Silane al., "Studies Treatment on of Water Mercerized Absorption Bamboo", of Instrument Bamboo-Polyester India; Design Development Polymer-Plastics Center, Technoloav Indian and Institute of Engineering, Technology 49: pages Delhi, 45-52, New Delhi,2010 (8 pages).
Lotz, Kevin, et al. "Structural analysis of three-dimensional mesh fabric by Micro X-ray computed tomography." Journal of Engineered Fibers and Fabrics 14 (2019) (13 pages).

* cited by examiner

ANIMAL BEDDING

REFERENCE TO RELATED APPLICATION

This application is a continuation-in-part application to U.S. application Ser. No. 15/906,727 (now U.S. Pat. No. 10,966,405), with the entirety of U.S. application Ser. No. 15/906,727 (U.S. Pat. No. 10,966,405) being incorporated by reference herein.

BACKGROUND

The domestic guinea pig is a common household pet. The guinea pig is docile by nature, friendly, and affectionate in response to handling and feeding. Care for the guinea pig typically includes a cage, such as a solid-bottom cage, and bedding added to the bottom of the cage. The bedding may include shredded paper, wood shavings, hay, or grass.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1:
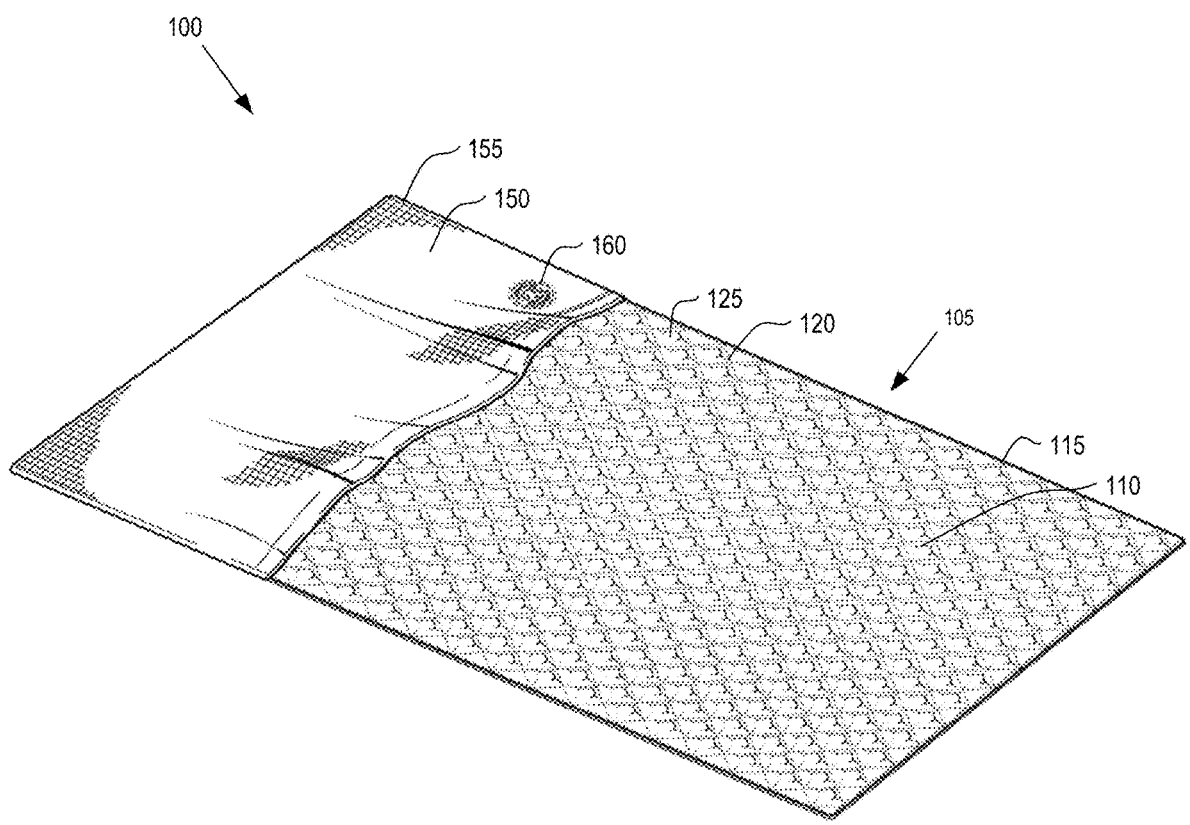
FIG. 1 is a front perspective view of the animal bedding.

Domesticated animals typically have some type of animal bedding. For example, guinea pigs typically thrive in an environment that has suitable bedding. However, typical guinea pig bedding suffers from several drawbacks. First, typical bedding, such as wood or shredded paper, results in the guinea pig living in its waste (e.g., urine and feces), leading to a potentially unhealthy situation. For example, the guinea pig may develop bumblefoot (i.e., pododermatitis) if the guinea pig's feet are exposed to its own waste in the wood or shredded paper. Second, wood or shredded paper results in a considerable amount of waste. Third, wood or shredded paper, needing to be replaced periodically, resulting in a big expense. Fourth, guinea pigs tend to jerk and leap into the air (typically term "popcorning"), resulting in waste/bedding being kicked out of the cage and into the household. Fifth, paper or wooded bedding may cause dust to be present in the environment. Since small animals, such as guinea pigs, are very close to the ground, the animals' noses may inhale the dust, causing respiratory-related diseases, such as URI (upper respiratory infection). As discussed further below, using fleece, which naturally does not have dust and has static properties to attract dust (which may be generated from hay, the guinea pigs' main source of food) from the environment, may reduce the dust exposure to the animals and, in turn, reduce incidence of respiratory-related diseases.

Various forms of animal bedding are envisioned. The below discussion focuses on guinea pig bedding. Nevertheless, any discussion regarding guinea pig bedding may be equally applied to other forms of animal bedding. In one implementation, the animal bedding includes a main section.

In another implementation, the animal bedding includes a main section and a pocket. In a first specific implementation, the main section comprises three layers, including a top layer, a middle layer, and a bottom layer. In a second specific implementation, the main section consists of the three layers.

The top layer may be made from a variety of materials. In one implementation, the top layer is composed of a material that is hydrophobic (e.g., tending to repel or fail to mix with water). In an alternate implementation, the top layer is composed of a material that is hydrophilic (e.g., tending to attract water). In still an alternate implementation, the top layer is composed of a blend of materials, with one material in the blend being hydrophilic and another material in the blend being hydrophobic (e.g., polyester/cotton blend). For example, one type of material for the top layer may comprise a synthetic fiber, such as a fabric woven or knitted from polyester (or other type of polymer) thread or yarn, a blend of polyester (or other type of polymer) with another material (e.g., cotton), or the like. One example material for the top layer is fleece, which may comprise a hydrophobic material. Fleece may come in different thicknesses, such as micro, 100, 200, and 300 grams per square meter (gsm), with 300 gsm being the thickest and least flexible and 100 gsm being less flexible. Further, fleece, may be made from polyester or other type of polymer. Alternatively, the top layer may comprise a plant-derived fiber, such as cotton or bamboo, which exhibit hydrophilic properties.

In one implementation, the middle layer may comprise a material that at least partly absorbs liquid (e.g., a hydrophilic material that attracts water). Specifically, the middle layer may comprise a material that is configured to break the liquid's surface tension so that the liquid moves into the spaces between fibers of the material, and into the fibers themselves. For example, the middle layer may comprise a cellulose-based material. Examples of cellulose-based materials include, but are not limited to: cotton; hemp; or bamboo. Other types of cellulose-based materials are contemplated. In the example of the middle layer being composed of bamboo, in one implementation, the middle layer may be entirely composed of bamboo. Alternatively, the middle layer may be composed of a bamboo blend (e.g., bamboo blended with polyester or other synthetic material). Various blends of bamboo may be used. In one implementation, the various blends of bamboo include: at least 30% bamboo and at most 70% of an alternate material (such as polyester or other synthetic fiber); at least 40% bamboo and at most 60% of an alternate material (such as polyester or other synthetic fiber); at least 60% bamboo and at most 40% of an alternate material (such as polyester or other synthetic fiber); at least 70% bamboo and at most 30% of an alternate material (such as polyester or other synthetic fiber); at least 75% bamboo and at most 25% of an alternate material (such as polyester or other synthetic fiber); at least 80% bamboo and at most 20% of an alternate material (such as polyester or other synthetic fiber); at least 85% bamboo and at most 15% of an alternate material (such as polyester or other synthetic fiber); at least 90% bamboo and at most 10% of an alternate material (such as polyester or other synthetic fiber); at least 95% bamboo and at most 5% of an alternate material (such as polyester or other synthetic fiber). In another implementation, the various blends of bamboo include: at least 30% bamboo and at most 70% of alternate materials (such as a blend of cotton fiber and polyester or other synthetic fiber); at least 40% bamboo and at most 60% of alternate materials (such as a blend of cotton fiber and polyester or other synthetic fiber); at least 60% bamboo and at most 40% of alternate materials (such as a blend of cotton fiber and polyester or other synthetic fiber); at least 70% bamboo and at most 30% of alternate materials (such as a blend of cotton fiber and polyester or other synthetic fiber); at least 75% bamboo and at most 25% of alternate materials (such as a blend of cotton fiber and polyester or other synthetic fiber); at least 80% bamboo and at most 20% of alternate material (such as a blend of cotton fiber and polyester or other synthetic fiber); at least 85% bamboo and at most 15% of alternate materials (such as a blend of cotton fiber and polyester or other synthetic fiber); at least 90% bamboo and at most 10% of alternate materials (such as a blend of cotton fiber and polyester or other synthetic fiber); at least 95% bamboo and at most 5% of alternate materials (such as a blend of cotton fiber and polyester or other synthetic fiber). Bamboo (or bamboo blends) exhibit good hydrophilic properties, thereby attracting water (or urine) from the animal. In still an alternate implementation, the middle layer may be composed entirely of cotton.

Thus, in one implementation, the middle layer may consist of a single material. As one example, the material may entirely consist of bamboo, as discussed above. As another example, the material may entirely consist of a synthetic material. One specific example of a synthetic material is a microfiber. Specifically, a microfiber is a synthetic fiber that is finer than one denier or decitex/thread, and may have a diameter of less than ten μm. Microfibers may be made from polyesters, polyamides (e.g., nylon, a para-aramid synthetic fiber (e.g., Kevlar®), a meta-aramid material (e.g., Nomex®), trogamide), or a conjugation of polyester, polyamide, and polypropylene.

In an alternate implementation, the middle layer may comprise a composite material (e.g., a blend of materials). As one example, the composite blend may comprise a cellulose fiber and a non-cellulose fiber (e.g., cellulose fibers and poly microfibers, such as bamboo blended with a synthetic fiber). As another example, the composite blend may comprise two or more types of cellulose fibers (e.g., bamboo/cotton blend). In one implementation, the bamboo may comprise bamboo pulp fiber.

In one implementation, at least a part of the bottom layer may be waterproof and/or at least partially water repelling (such as completely water repelling). For example, at least a part, such as one or more surfaces of the bottom layer, may be hydrophobic. The bottom layer may comprise a material with a plastic coating or laminate. The material may be composed of cotton, synthetic (e.g., polyester), or a cotton/synthetic blend (e.g., polyblend). The material may be coated or laminated with polyurethane laminate (PUL), commonly known as PUL Fabric. In one implementation, at least one side of the bottom layer has a laminate (such as PUL). In a first specific implementation, the side of the bottom layer closer to the middle layer is the side with the laminate. Specifically, when assembled, the laminate side of the bottom layer touches or contacts the middle layer, as discussed below. In a second specific implementation, the side of the bottom layer further from the middle layer is the side with the laminate. Specifically, when assembled, the laminate side of the bottom layer does not touch or contact the middle layer (and instead contacts the ground). In a third specific implementation, both sides of the bottom layer include the laminate. Thus, in one implementation, the bottom layer is composed of a material that is hydrophobic. In an alternate implementation, the bottom layer is composed of a material that is hydrophilic. In still an alternate implementation, the bottom layer is composed of a blend of materials, with one material in the blend being hydrophilic and another material in the blend being hydrophobic (e.g., polyester/cotton blend).

In this way, fluid, such as urine, may pass through the top layer and be absorbed in the middle layer. Further, the fluid that is in the middle layer may remain in the middle layer without passing through to the bottom layer (such as due to the laminate in the bottom layer).

In one implementation, the top layer, the middle layer, and the bottom layer are attached to one another. In a specific implementation, the top layer, the middle layer, and the bottom layer are stitched together along a perimeter, as described in more detail below.

In an alternate implementation, in addition to attaching the top layer, the middle layer and the bottom layer together, the top layer and middle layer (but not the bottom layer) are attached together separately. In a first specific implementation, the means of attachment of the top layer, the middle layer and the bottom layer is the same as the separate means of attachment of the top layer and the middle layer. For example, stitching may be used to attach the top layer, the middle layer, and the bottom layer together, and stitching may also be used to separately attach the top layer and the middle layer. In a second specific implementation, the means of attachment of the top layer, the middle layer and the bottom layer is different than the separate means of attachment of the top layer and the middle layer.

As discussed above, the location for attachment of the top layer, middle layer, and bottom layer are different from the location for separate attachment for the top layer and middle layer. For example, the top layer, middle layer, and bottom layer may be attached along a periphery or perimeter of the main section, as discussed above, and the top layer and middle layer may be separately attached in an interior of the main section. Further, the separate attachment of the top layer and middle layer may be in a pattern. For example, the stitching that attaches the top layer and middle layer may create a diamond pattern, square pattern, or the like as viewed on the top layer.

The separate attachment of the top layer to the middle layer may result in quilting. Quilting may result in one or more benefits. First, the middle layer, such as the bamboo or bamboo blend, even if the material (e.g., the bamboo) in the middle layer loosens, the middle layer will not shift significantly due to the quilting. Second, the quilting may hold the top layer and middle layer together better. Third, hay (or other debris) stuck in the top layer material (e.g., in the fleece material of the top layer) may be more easily removed because of the quilting.

In one implementation, a pocket may be attached to the main section (e.g., attached to at least one side or one edge of the main section). For example, the pocket may be attached on three sides or three edges to the main section, with the fourth side or fourth edge of the pocket being used as an opening for the animal to enter/exit the pocket. As another example, the pocket may be attached on two sides or two edges to the main section (such as to only two sides or two edges that meet in a corner of the main section). As still another example, the pocket may be attached to only one side or one edge of the main section. Certain animals, such as guinea pigs, are prey animals. In the wild, guinea pigs spend time underground. The pocket allows the guinea pig to burrow therein, where it is considered safe and dark. In one manner of manufacture, the three layers are attached to one another to form the main section, and thereafter, the pocket is attached to the main section. The method of attachment (e.g., stitching) for the three layers to form the main section may be the same method of attachment (e.g., stitching) for attaching the pocket to the main section. For example, the three layers may be stitched along a periphery to form the main section. Likewise, the pocket may be stitched along at least a part of the same periphery (such on three sides of the pocket) in order to attach the pocket to the main section. Alternatively, the method of attachment for the three layers to form the main section may be different from the method of attachment for attaching the pocket to the main section. Further, when the pocket is attached to the main section, the pocket may abut the top layer of the main section. Further, flipping back the pocket behind the main section results in the pocket abutting the bottom layer of the main section. In addition, in one implementation, the pocket may be constructed of the same material as the top layer. For example, the pocket may be constructed of a fleece material similar to the top layer.

Each fleece layer may include a softer side and a rougher side. Given this, the pocket may be formed such that only the softer side of the fleece material is exposed to the guinea pig. In one example, two fleece layers may be sewn together such that both sides of the pocket (e.g., the top side of the pocket (which the guinea pig touches when sitting on the pocket) and the underside of the pocket (which the guinea pig touches when burrowing in the pocket)) have the softer side of the fleece material exposed. Alternatively, a single fleece layer may be folded over such that both sides of the pocket have the softer side of the fleece material exposed. In contrast, the top layer may be constructed of one layer of fleece material, with the softer side of the fleece material abutting the pocket (and exposed to the guinea pig when the guinea pig is burrowing in the pocket or sitting on the main section) and the other side of the fleece material (e.g., the rougher side) abutting the middle layer (and therefore not exposed to the guinea pig). In still an alternate implementation, the pocket may be composed of 200-250 gsm fleece, whereas the top layer may be composed of 100-150 gsm fleece. Alternatively, the pocket may be composed of 200-300 gsm fleece, whereas the top layer may be composed of 100-150 gsm fleece. In this way, the top layer and the pocket may be formed of the same material; however, the configuration of the material for the pocket (e.g., such that two layers of fleece are used) may be different than the configuration of the top layer (e.g., such that a single layer of fleece is used).

Embodiments

Figure 2A:
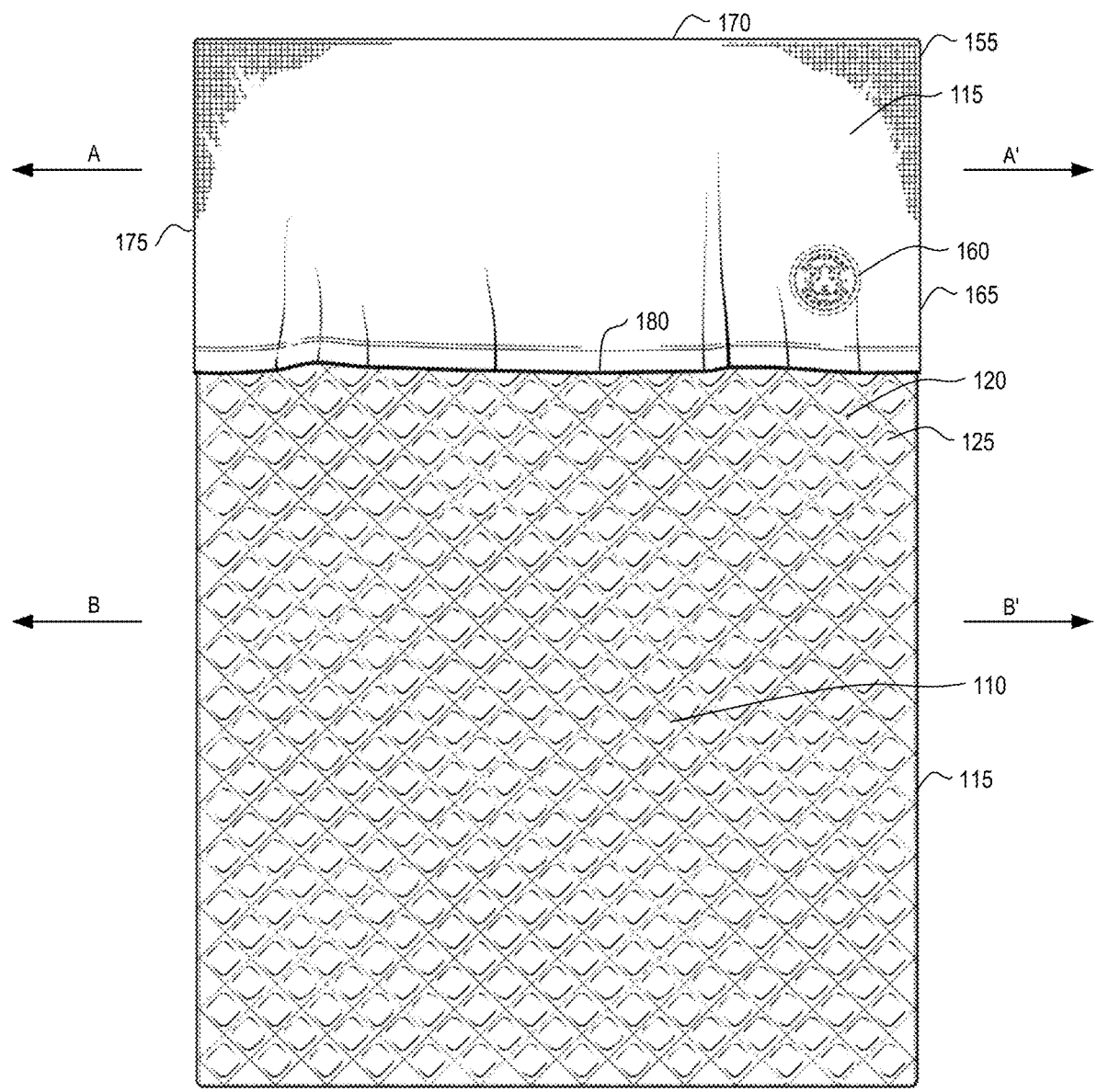
FIG. 2A is a front view of the animal bedding illustrated in FIG. 1.
Figure 9:
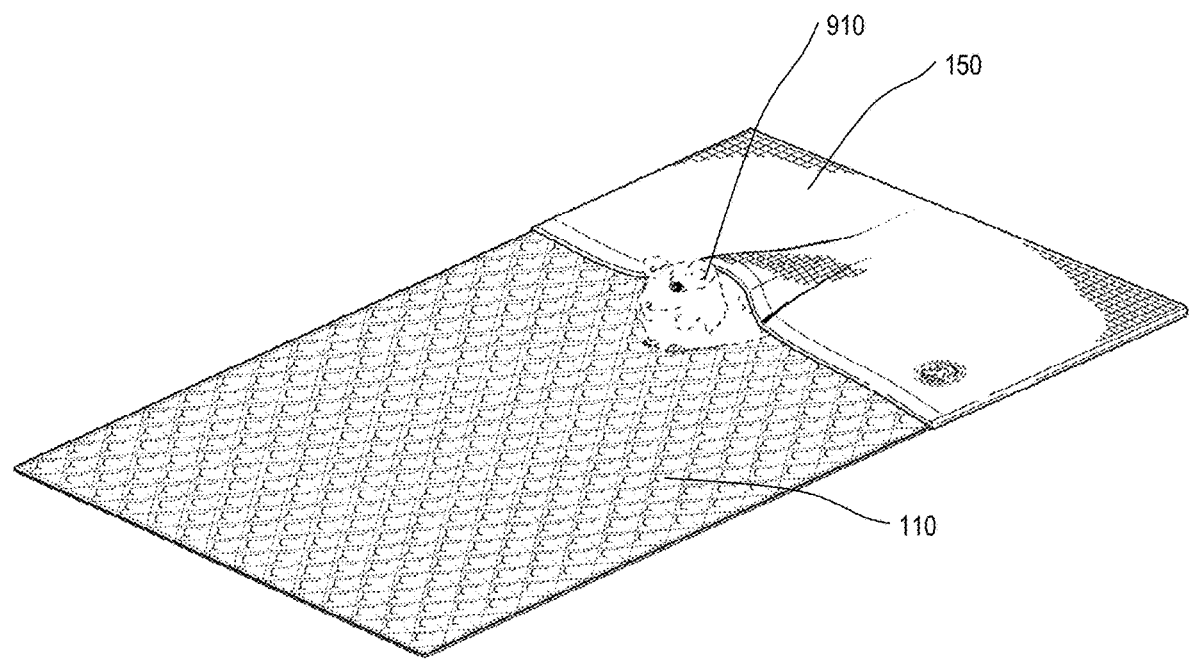
FIG. 9 is a front perspective side view of the animal bedding illustrated in FIG. 1 with a guinea pig shown.

Referring to the figures, FIG. 1 is a front perspective view of the animal bedding 100. FIG. 2A is a front view of the animal bedding illustrated in FIG. 1. The animal bedding 100 illustrated in FIG. 1 includes a main section 105 and a pocket 150. As discussed above, the pocket may be used by an animal to burrow therein. For example, FIG. 9 is a front perspective side view of the animal bedding illustrated in FIG. 1 with a guinea pig 910 shown within pocket 150. Alternatively, the animal bedding may consist of the main section 105 without the pocket 150.

Figure 8A:
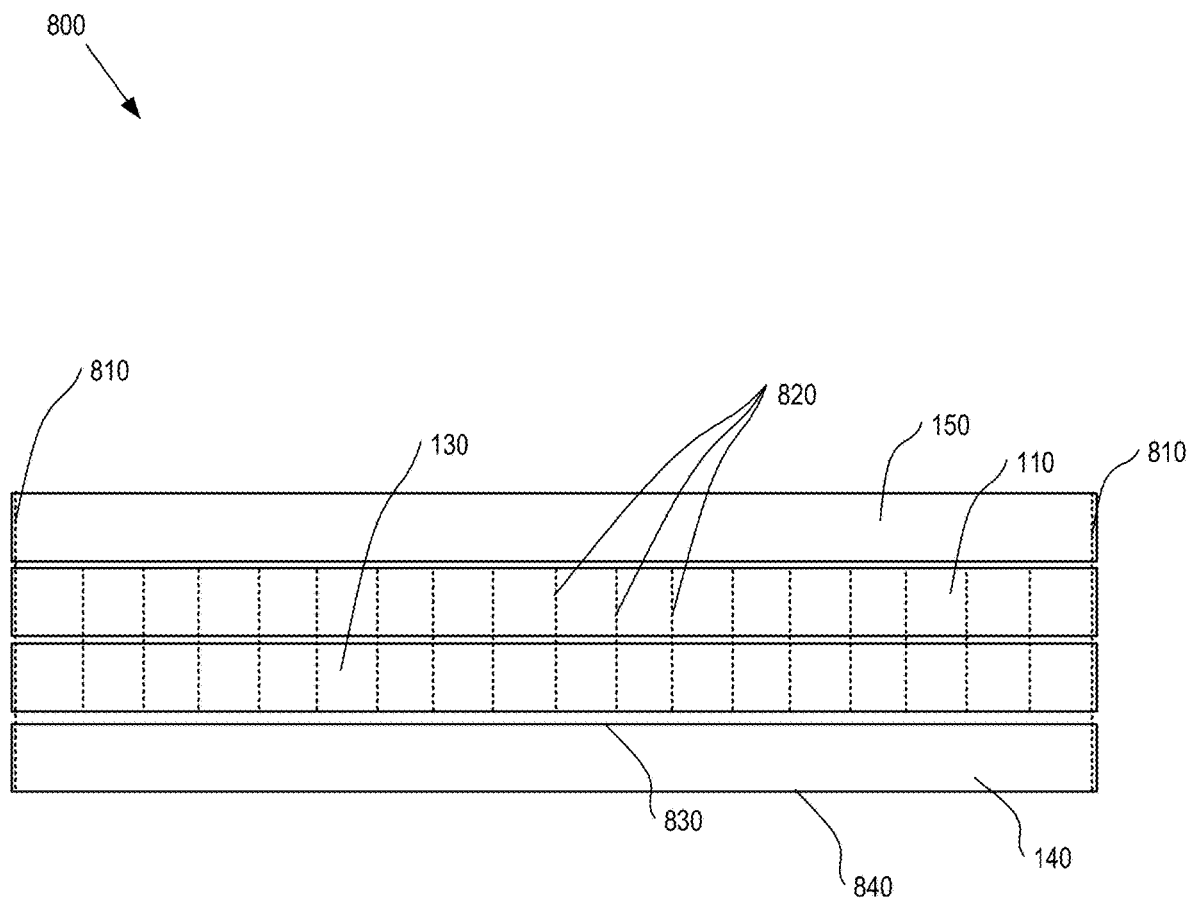
FIG. 8A is a cross-section at A-A' of FIG. 2A.
Figure 8B:
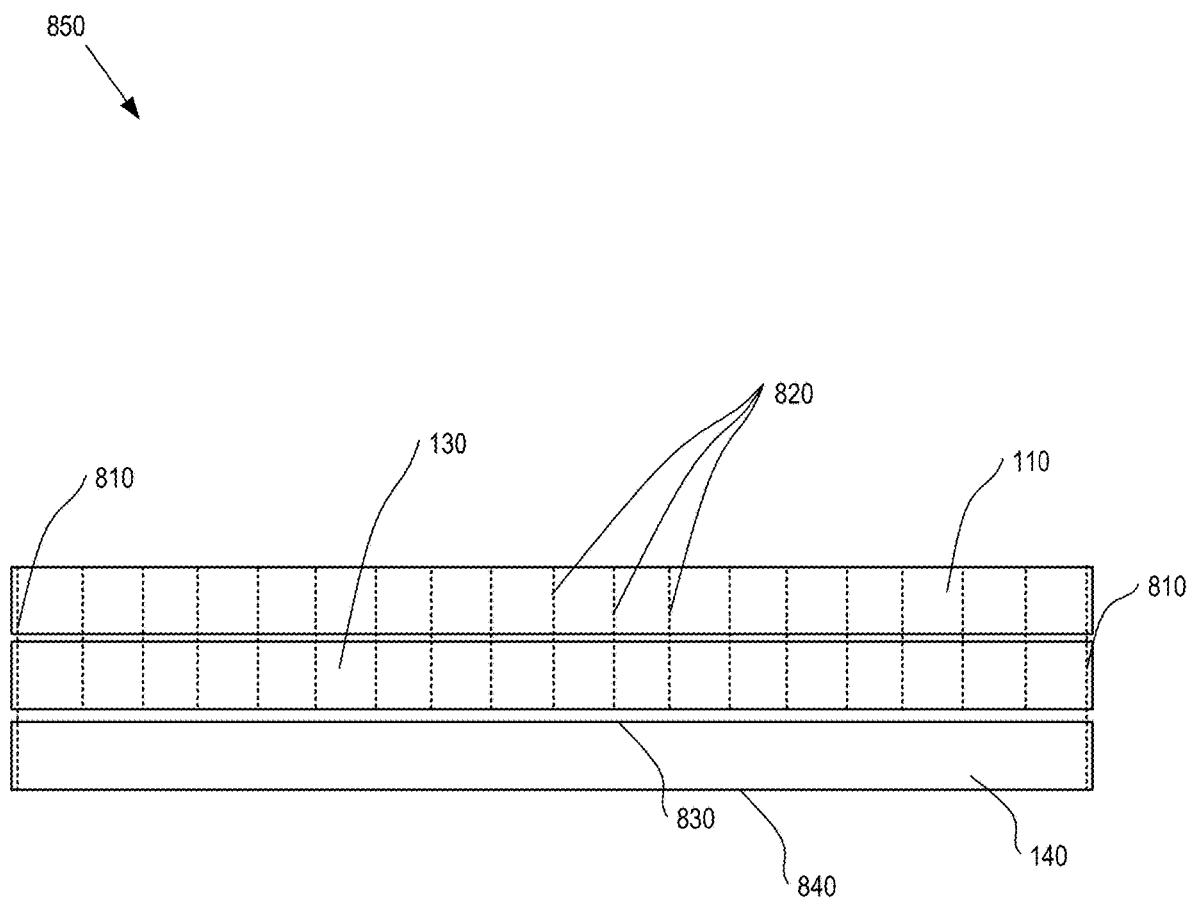
FIG. 8B is a cross-section at B-B' of FIG. 2A.

Main section 105 includes a top layer 110, a middle layer 130, and a bottom layer 140. Though not illustrated in FIG. 1, the middle layer is shown in FIGS. 8A-B. Further, the bottom layer is illustrated in FIGS. 3A-B and 8A-B. As discussed above, the top layer 110 may be made from a variety of materials, such as hydrophobic materials. Example materials include synthetic fibers (e.g., fleece) or synthetic blends. Likewise, the middle layer 130 may be made from a variety of materials, such as hydrophilic materials. Example materials include cellulose-based materials, such as bamboo or bamboo blends. The bottom layer 140 likewise may be made from a variety of materials, such as materials, with at least part of which are waterproof and/or water repelling. For example, the bottom layer may be composed of a fabric. In one implementation, the fabric for the bottom layer may be composed of cotton, synthetic (e.g., polyester), or a cotton/synthetic blend (e.g., polyblend), with a plastic coating or laminate applied to a side facing the middle layer, as discussed further below.

The top layer 110, middle layer 130, and bottom layer 140 may be connected or attached together in one of several ways. In one way, stitching may connect the top layer 110, middle layer 130, and bottom layer 140 together. For example, FIGS. 1 and 2A illustrate stitching 115 around an entire perimeter of main section 105. Alternatively, stitching may be less than the entire perimeter. Further, separate from attaching the top layer 110, middle layer 130, and bottom layer 140 together, at least two of the components of the main section (but not the third component of the main section) may be connected together as well. For example, top layer 110 and middle layer 130 (but not bottom layer 140) may be connected separately. For example, stitching 120 may connect top layer 110 and middle layer 130, as illustrated in FIGS. 1 and 2A. Stitching 120 may be in an interior of main section 105, such as interior to the perimeter of main section. In this regard, stitching 120 (connecting top layer 110 and middle layer 130) is in a different part of main section 105 than stitching 115 (connecting top layer 110, middle layer 130, and bottom layer 140). Further, stitching 120 results in quilting 125 or bunching of the middle layer 130.

Figure 2B:
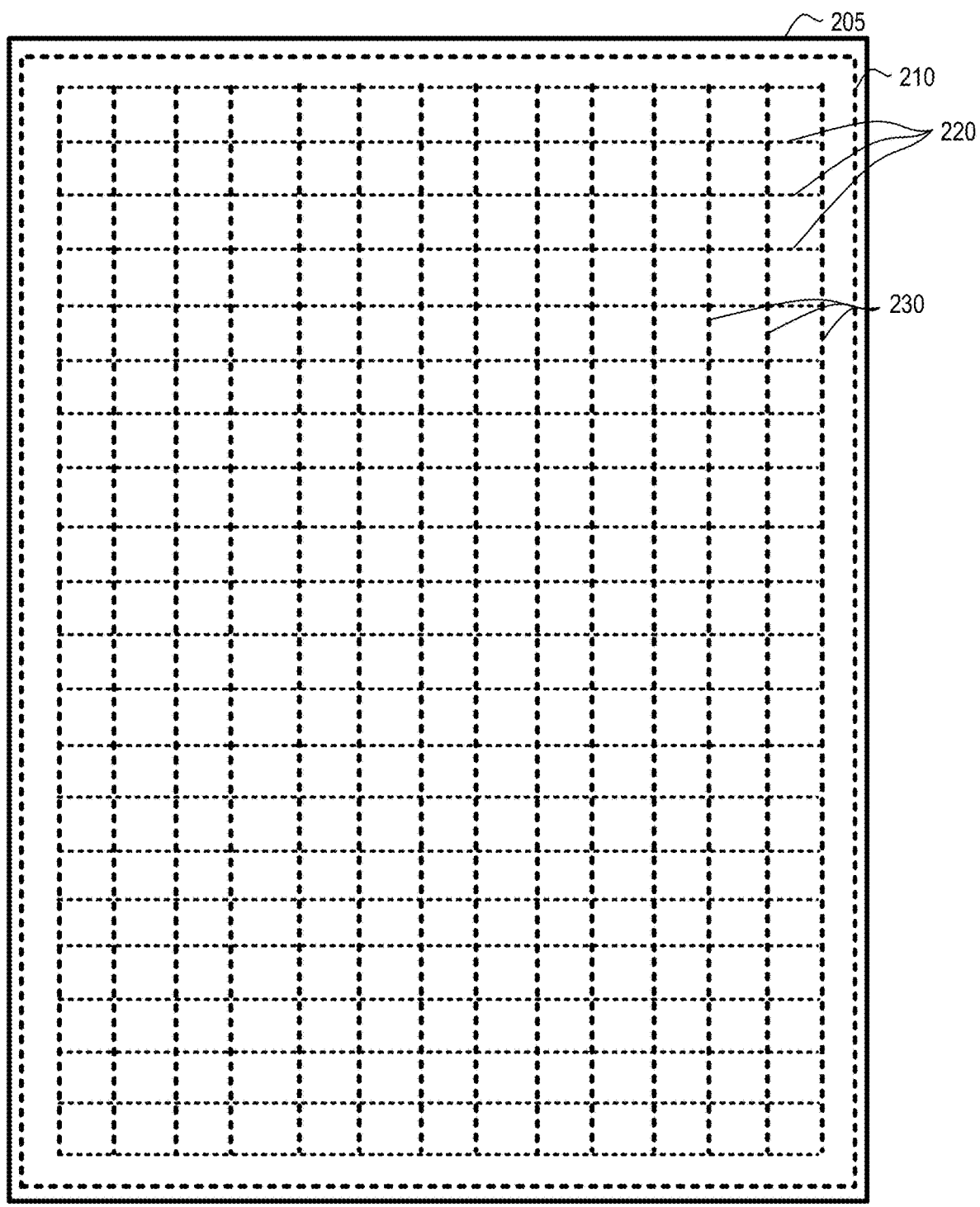
FIG. 2B is an alternate front view of the animal bedding comprising the main section with the pocket absent.
Figure 10:
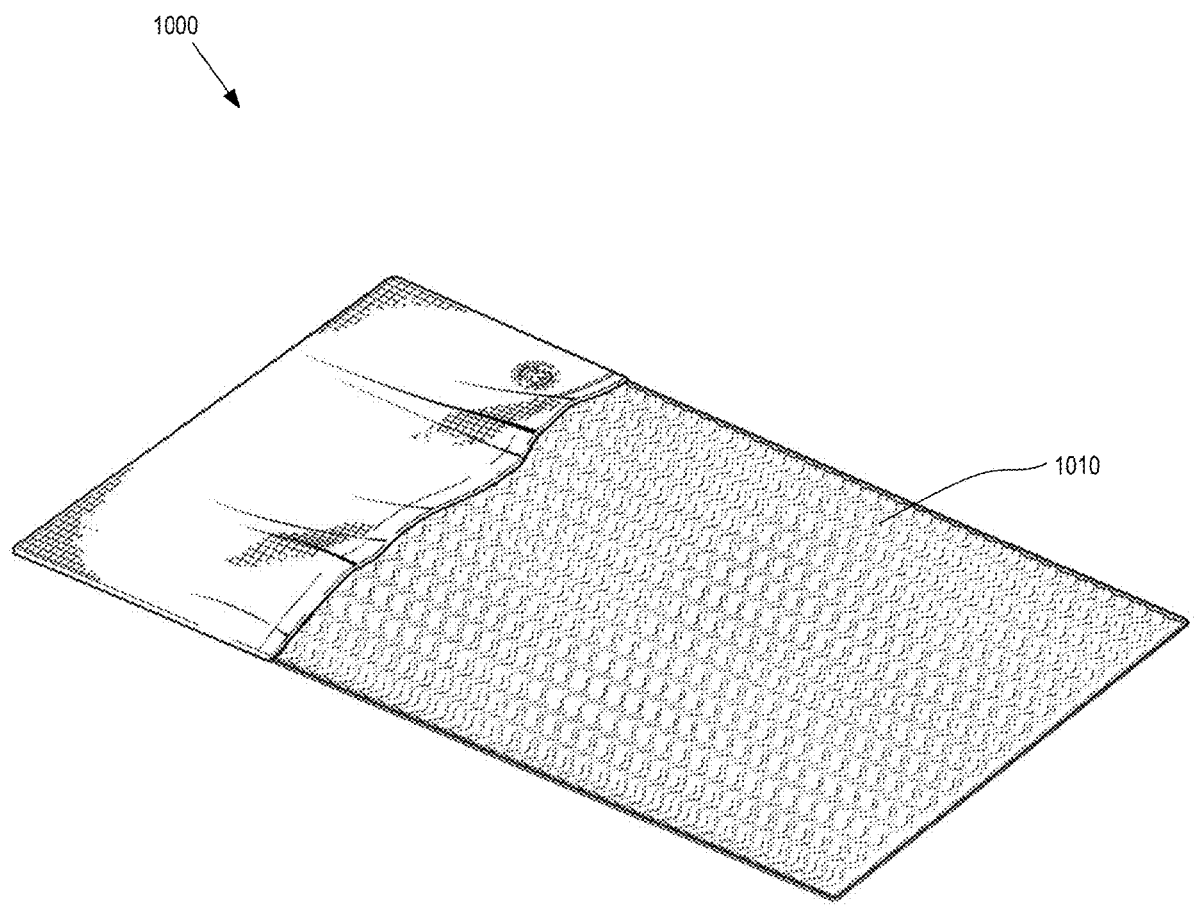
FIG. 10 is a front perspective view of another implementation of the animal bedding illustrating the main section and the pocket, with the pocket covering part of the top layer of the main section and with the top layer of the main section including a wave stitching pattern in dashed lines.
Figure 11:
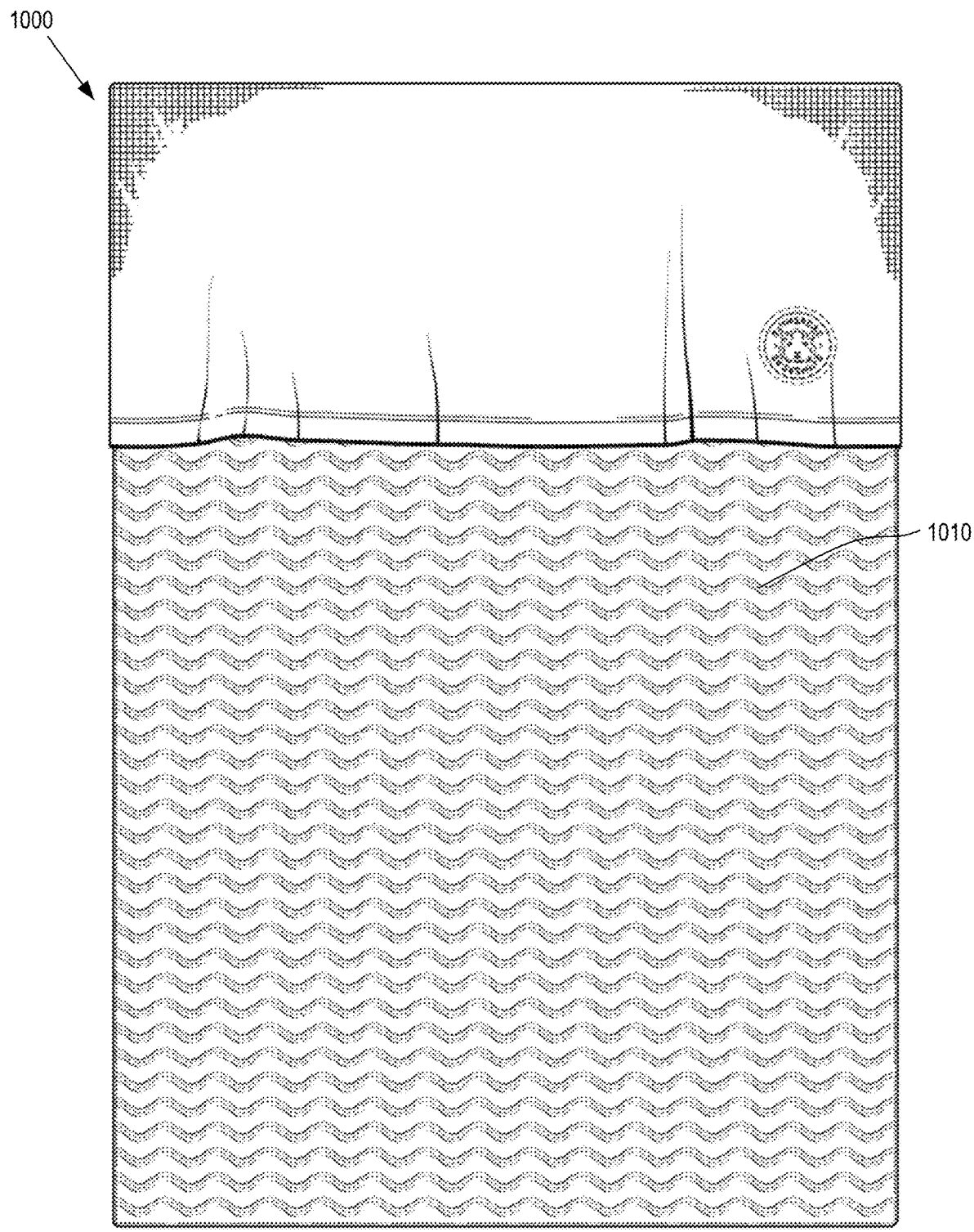
FIG. 11 is a front elevation view of the animal bedding of FIG. 10.
Figure 12:
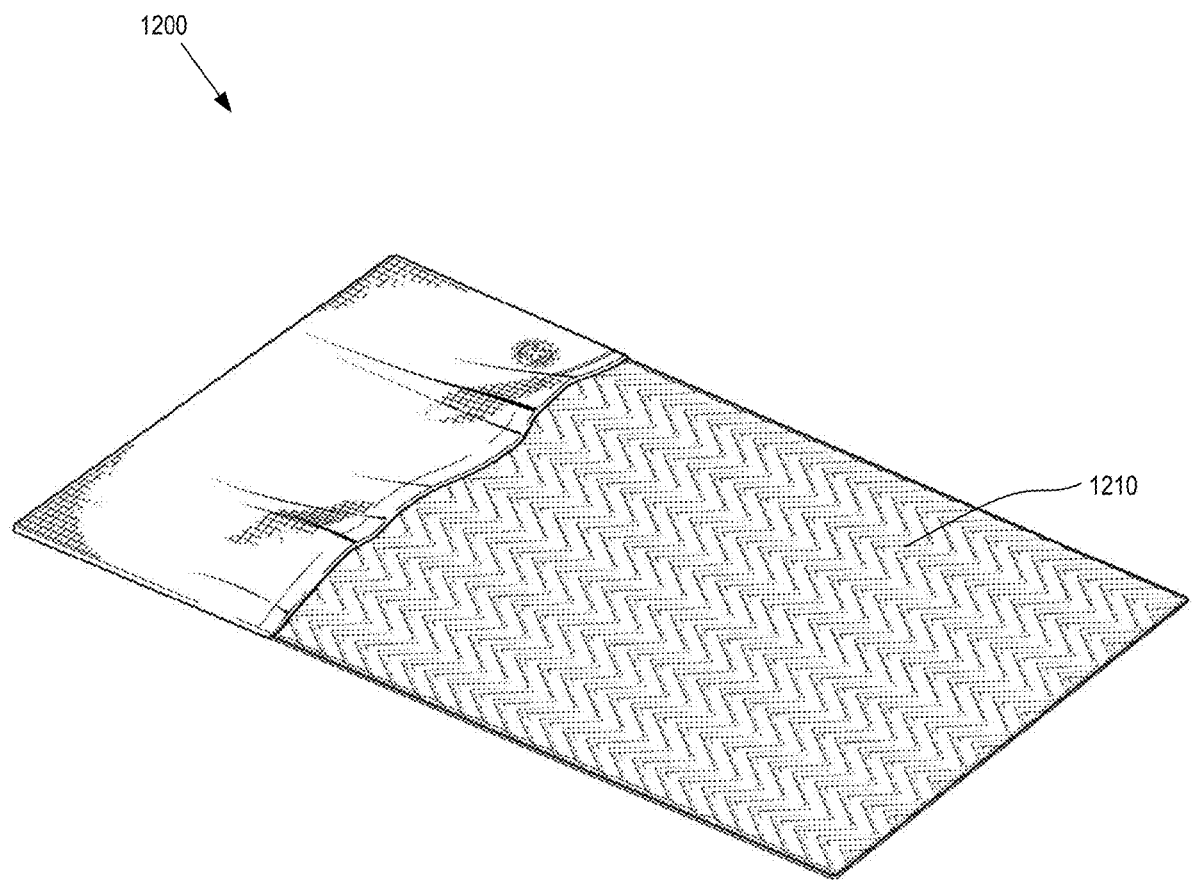
FIG. 12 is a front perspective view of the animal bedding illustrating the main section and the pocket, with the pocket covering part of the top layer of the main section and with the top layer of the main section including a zigzag stitching pattern in dashed lines.
Figure 13:
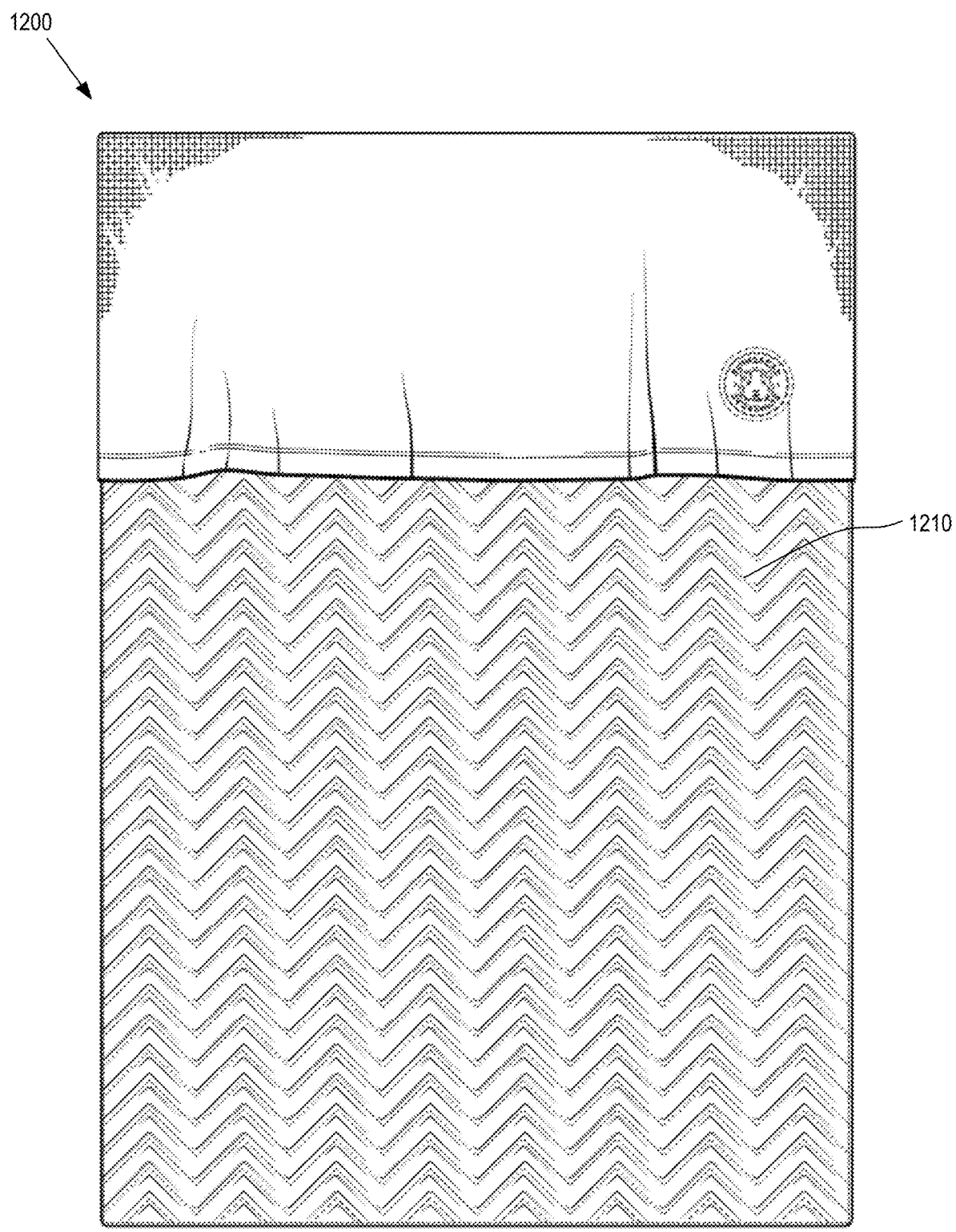
FIG. 13 is a front elevation view of the animal bedding of FIG. 12.

Various patterns of stitching of the top layer 110 and middle layer 130 are contemplated. For example, stitching 120 results in a diamond shaped pattern. As another example, stitching may result in another type of quadrilateral shape pattern, such as a square shaped pattern, as shown in FIG. 2B, which is an alternate front view of the animal bedding comprising the main section 205 with the pocket absent. FIGS. 10-13 illustrate other types of stitching patterns. FIG. 10 is a front perspective view of another implementation of the animal bedding 1000 illustrating the main section and the pocket, with the pocket covering part of the top layer of the main section and with the top layer of the main section including a wave stitching pattern 1010 in dashed lines. FIG. 11 is a front elevation view of the animal bedding 1000 of FIG. 10. FIG. 12 is a front perspective view of the animal bedding 1200 illustrating the main section and the pocket, with the pocket covering part of the top layer of the main section and with the top layer of the main section including a zigzag stitching pattern 1210 in dashed lines. FIG. 13 is a front elevation view of the animal bedding 1200 of FIG. 12.

In particular, stitching 210 connects top layer, middle layer, and bottom layer. As shown, stitching 210 is along a periphery of main section 205. Separate from stitching 210, other stitching connects top layer and middle layer. Specifically, vertical stitching 220 and horizontal stitching 230 form a grid of squares (or other type of quadrilateral) that connects top layer and middle layer, but not bottom layer.

Pocket 150 may also be attached to main section 105, such as by stitching along three sides 165, 170, 175 of pocket 150. Fourth side 180 of pocket 150 is not attached to main section 105. In one implementation, pocket 150 is less than half the surface area of main section 105 (e.g., pocket 150 may be ¼ or less than ¼ of the surface area of main section 105). As discussed below, in one implementation, pocket 150 may be attached to all of top layer 110, middle layer 130 and bottom layer 140. Alternatively, pocket 150 may be attached only to top layer 110 but not to middle layer 130 or bottom layer 140.

Figure 3A:
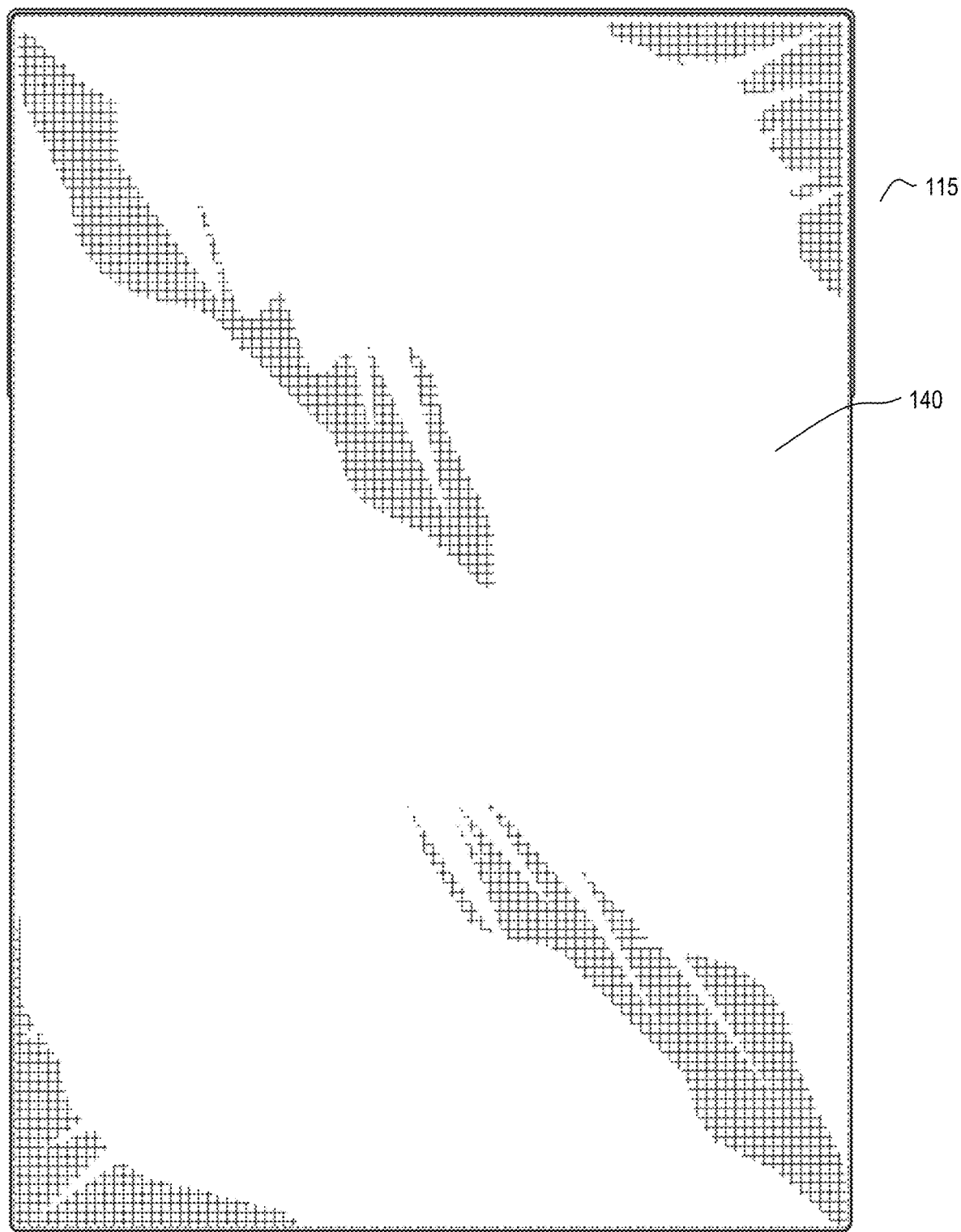
FIG. 3A is a first back view of the animal bedding illustrated in FIG. 1.
Figure 3B:
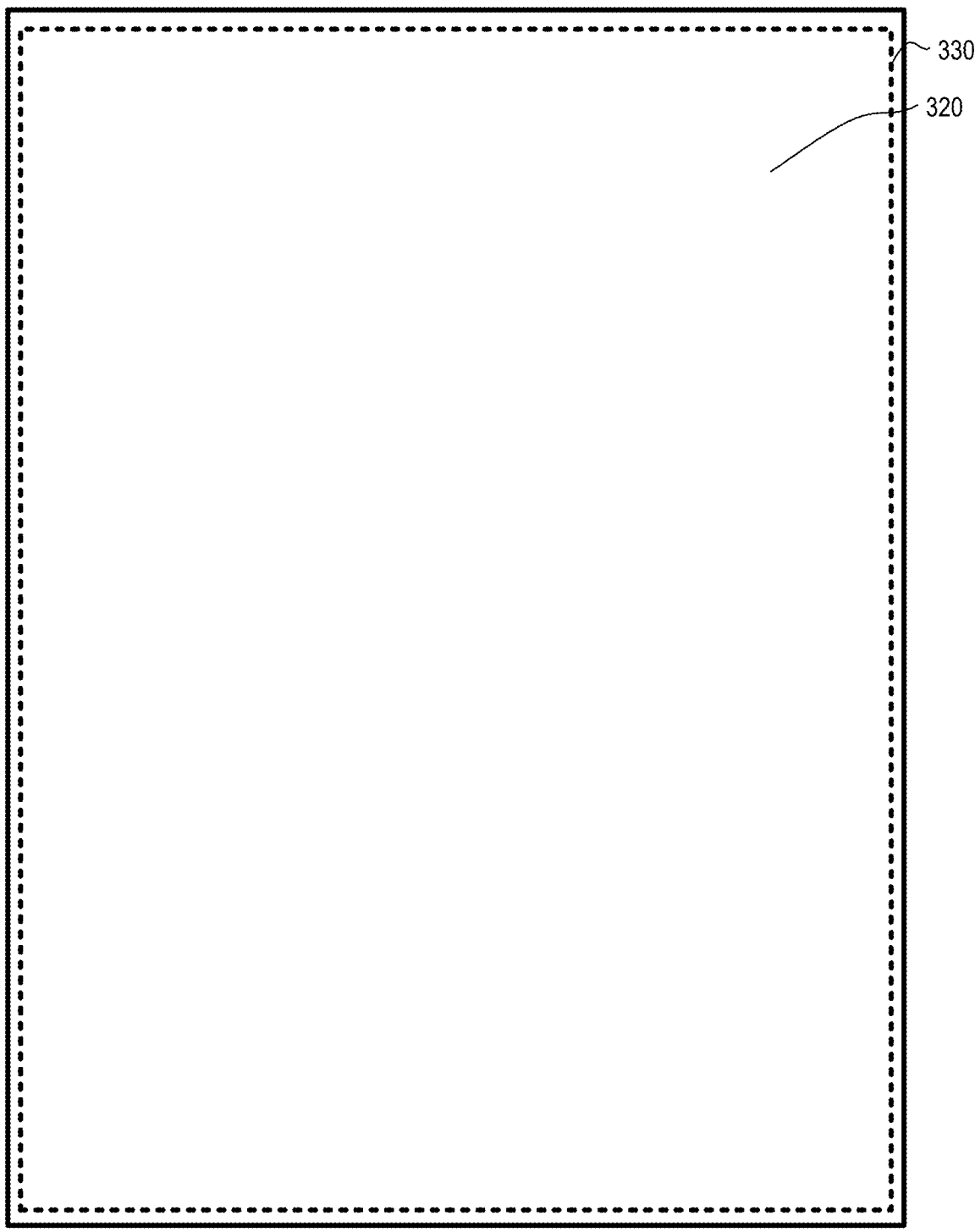
FIG. 3B is a second back view of the animal bedding illustrated in FIG. 1.

FIG. 3A is a first back view of the animal bedding 100 illustrated in FIG. 1. As shown, stitching 115 is along a periphery of the bottom layer 140. Similarly, FIG. 3B is a second back view of the animal bedding 100 illustrated in FIG. 1, with stitching 330 along the periphery of bottom layer 320.

Figure 4:
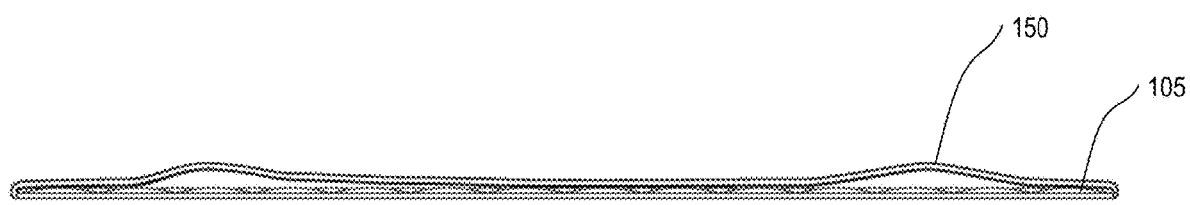
FIG. 4 is a bottom side view (a side view from the perspective of the main section—opposite the side where the pocket is connected to the main section) of the animal bedding illustrated in FIG. 1.
Figure 5:
FIG. 5 is a top side view (a side view from the perspective of where the pocket is connected to the main section) of the animal bedding illustrated in FIG. 1.
Figure 6:
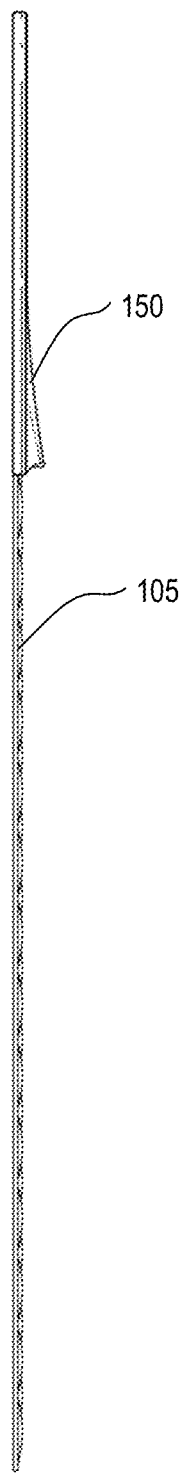
FIG. 6 is a left side view of the animal bedding illustrated in FIG. 1.
Figure 7:
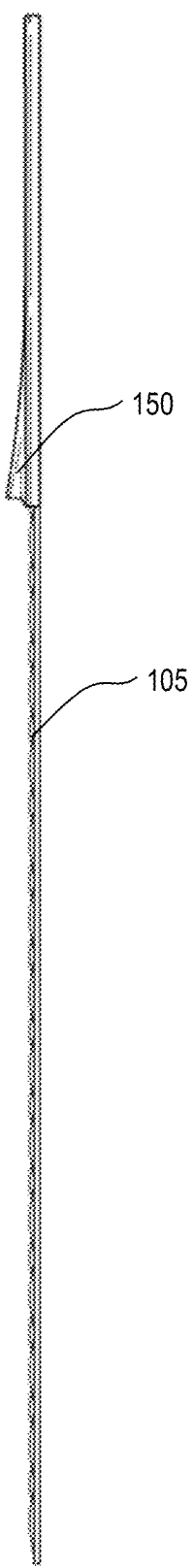
FIG. 7 is a right side view of the animal bedding illustrated in FIG. 1.

FIG. 4 is a top side view of the animal bedding 100 illustrated in FIG. 1, showing pocket 150 and main section 105. Likewise, FIG. 5 is a bottom side view of the animal bedding 100 illustrated in FIG. 1, showing pocket 150 and main section 105. FIG. 6 is a left side view of the animal bedding 100 illustrated in FIG. 1, showing pocket 150 and main section 105. Further, FIG. 7 is a right side view of the animal bedding 100 illustrated in FIG. 1, showing pocket 150 and main section 105.

FIG. 8A is a cross-section at A-A' of FIG. 2A. In particular, FIG. 8A illustrates pocket 150, top layer 110, middle layer 130 and bottom layer 140, with stitching connecting the various parts. For example, pocket 150 may be connected to top layer 110 (and optionally middle layer 130 and bottom layer 140) via stitching. As shown in FIG. 8A, stitching 810 connects pocket 150 to all of top layer 110, middle layer 130, and bottom layer 140. For implementations without pocket 150, stitching 810 attaches top layer 110, middle layer 130, and bottom layer 140 together. Stitching 810 may be along the edge of each of the four sides, such as illustrated by stitching 210 in FIG. 2B. Separate from stitching 810, stitching 820 may connect top layer 110 and middle layer 130. As shown, stitching 820 is a regular pattern in an interior. As discussed above, the pattern may comprise a diamond pattern, a wave pattern, a zig-zag pattern, or the like. Finally, bottom layer 140 includes surfaces 830 and 840. When bottom layer is attached via stitching 810, surface 830 abuts middle layer 130. In a first implementation, surface 830 may be treated with a laminate or other material that makes surface 830 waterproof and/or at least partially water repelling (such as completely water repelling). In a second implementation, surface 840 may be treated with a laminate or other material that makes surface 840 waterproof and/or at least partially water repelling (such as completely water repelling). In a third implementation, surfaces 830 and 840 may be treated with a laminate or other material that makes surfaces 830 and 840 waterproof and/or at least partially water repelling (such as completely water repelling). The thicknesses illustrated in FIG. 8A are merely for illustration purposes only. Example thicknesses are provided below. Further, FIG. 8A includes gaps between pocket 150 and top layer 110, top layer 110 and middle layer 130, and middle layer 130 and bottom layer 140. The gaps between the various layers and the pocket may not be present.

FIG. 8B is a cross-section at B-B' of FIG. 2A. FIG. 8B is similar to FIG. 8A, except for the absence of pocket 150.

The following are examples of the materials, weights, thickness details of various parts of the animal bedding. The examples are merely for illustration purposes. For example, the pocket (or pocket layer) may comprise the following: term of the material: 100% Polyester; weight: 250 gsm; thickness: 0.7 mm. The top layer may comprise the following: term of the material: 100% Polyester; weight: 180 gsm; thickness: 0.48 mm. In the example of the middle layer being composed of a bamboo absorbent layer: term of the material: Bamboo fiber batting; weight: 400 gsm; thickness: 1 cm; blend: Bamboo fiber 70%, polyester 30%. As discussed above, various percent bamboo blends are contemplated. As another example, the waterproof bottom layer may comprise the following: term of the material: 100% Polyester; total weight: 130 gsm; overall thickness (including material and laminate): 0.44 mm; laminate weight: 40 gsm; laminate thickness: 0.02 mm; non-laminate material thickness: 0.42 mm; non-laminate material weight: 90 gsm.

As discussed above, one or more layers may be positioned between the top layer and the bottom layer. For example, the top layer may be composed of a variety of materials, such as material that is hydrophobic, material that is hydrophilic, or a blend of materials (such as one material in the blend being hydrophilic and another material in the blend being hydrophobic). The one or more middle layers may comprise at least one middle layer that at least partly absorbs liquid (e.g., a hydrophilic material that attracts water). In one or some embodiments, the bottom layer may be waterproof and/or at least partially water repelling (such as completely water repelling).

Figure 14A:
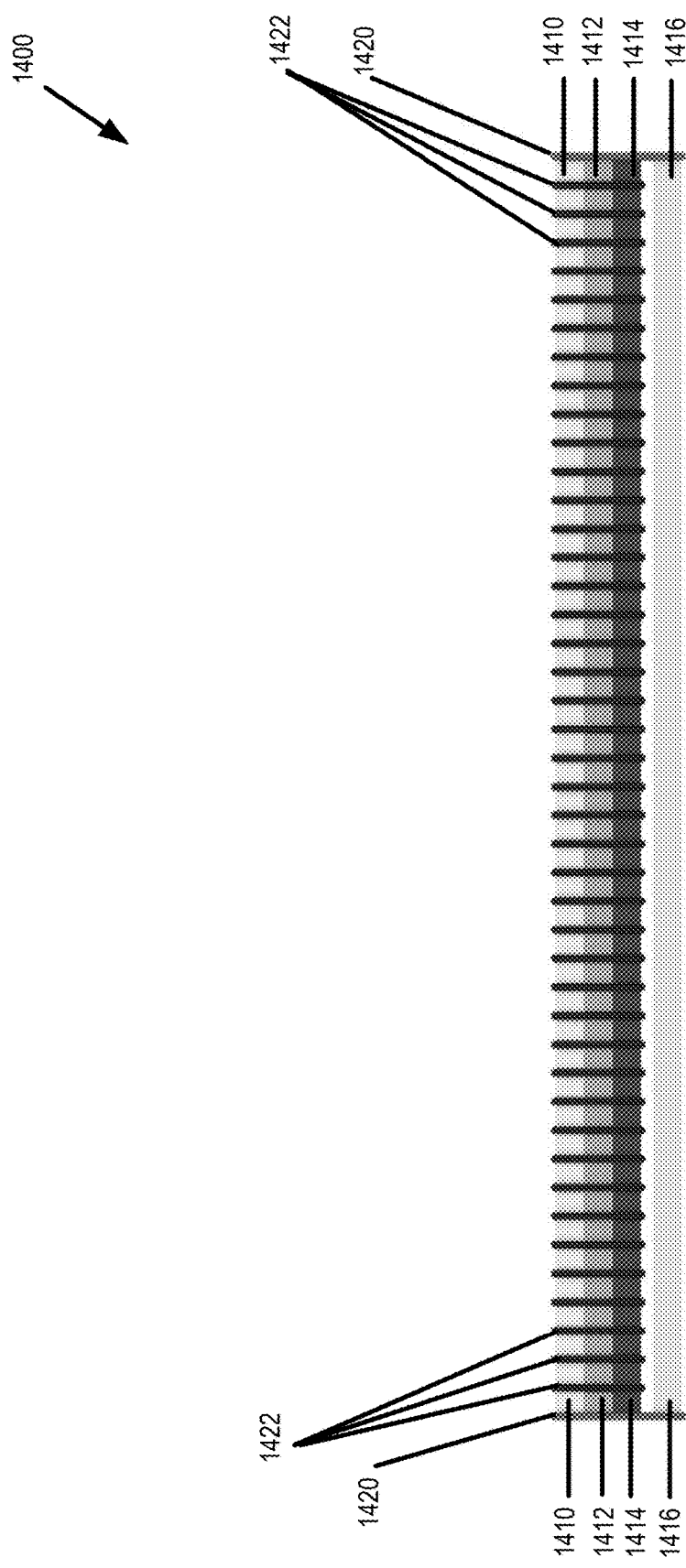
FIG. 14A is a side cross-sectional view of another example of animal bedding illustrating a fleece layer, an absorbent layer, a 3D air mesh layer, and a waterproof layer, with the fleece layer, the absorbent layer, and the 3D air mesh layer stitched together so that a pattern is present on the top surface of the fleece layer.

FIG. 14A is a side cross-sectional view 1400 of another example of animal bedding illustrating a fleece layer 1410 (which is an example of the top layer), an absorbent layer 1412 (which is one example of one of the one or more middle layers and comprises a hydrophilic material), a 3D air mesh layer 1414 (which is another example of one of the one or more middle layers), and a waterproof layer 1416 (which is an example of the bottom layer).

The fleece layer 1410, the absorbent layer 1412, and the 3D air mesh layer 1414 are stitched together using stitching 1422 so that a pattern is present on the top surface of the fleece layer 1410. An example of the pattern comprises a diamond shaped pattern, such as illustrated, for example, in FIG. 1. Other patterns are contemplated, as discussed above.

FIG. 14A further illustrates stitching 1420. Thus, FIG. 14A illustrates two attachments, with a first attachment (e.g., stitching 1420) that attaches the top layer (e.g., fleece layer 1410) with the bottom layer (e.g., waterproof layer 1416) and with a second attachment (e.g., stitching 1422) that attaches the top layer (e.g., fleece layer 1410) with the one or more middle layers (e.g., both the absorbent layer 1412 and the 3D air mesh layer 1414). As shown, stitching 1420 also connects the absorbent layer 1412 and the 3D air mesh layer 1414 with the waterproof layer 1416. Stitching 1420 may be along at least a part of the periphery of the animal bedding, such as along an entirety of the periphery of the animal bedding (e.g., such as similar to stitching 115 around an entire perimeter of main section 105). Alternatively, or in addition, stitching 1422 may be such that a pattern may be present on at least a part of the surface of the fleece layer 1410, such as at least over 50% of the surface of the fleece layer 1410, at least over 60% of the surface of the fleece layer 1410, at least over 70% of the surface of the fleece layer 1410, at least over 80% of the surface of the fleece layer 1410, at least over 90% of the surface of the fleece layer 1410, or 100% of the surface of the fleece layer 1410.

Thus, FIG. 14A illustrates that 3D air mesh layer 1414 is positioned between absorbent layer 1412 and waterproof layer 1416. In one embodiment, there may be no other layers so that 3D air mesh layer 1414 is sandwiched directly between absorbent layer 1412 and waterproof layer 1416. Alternatively, one or more layers may be positioned on either side of 3D air mesh layer 1414 (e.g., one or more layers between 3D air mesh layer 1414 and absorbent layer 1412 and/or one or more layers between 3D air mesh layer 1414 and waterproof layer 1416) so that 3D air mesh layer 1414 is sandwiched indirectly between absorbent layer 1412 and waterproof layer 1416.

3D air mesh layer 1414 may include one or more qualities, such as one or both of: (1) greater rigidity (e.g., the 3D air mesh layer 1414 is more rigid (e.g., has less flexibility) than one or both of absorbent layer 1412 or waterproof layer 1416); and (2) at least partly repel water. 3D air mesh layer 1414 may include gaps (such as air gaps resulting in a 3D air mesh) within the 3D structure (e.g., a honeycomb structure), such that the 3D air mesh layer 1414 may comprises any one of the following solid/air structures: 90% structure vs. 10% air; 80% structure vs. 20% air; 70% structure vs. 30% air; 60% structure vs. 40% air; 50% structure vs. 50% air; 40% structure vs. 60% air; 30% structure vs. 70% air; 20% structure vs. 80% air; or 10% structure vs. 90% air. 3D air mesh layer 1414 may be composed of a variety of material. As one example, 3D air mesh layer 1414 may be composed of polyester.

In one or some embodiments, 3D air mesh layer 1414 may be composed of at least two separate fabric layers knitted together. Alternatively, 3D air mesh layer 1414 may be composed of at least three separate fabric layers knitted together (e.g., in a three fabric layer 3D air mesh layer 1414, a face and a back may be connected by a monofilament yarn to produce a connecting cushion). Still alternatively, 3D air mesh layer 1414 may be composed of at least four separate fabric layers knitted together. In one or some embodiments, each layer of the 3D air mesh layer 1414 may be knitted simultaneously by a single machine. An example disclosure of cushioning fabric is in US Patent Application Publication No. 2004/0216328 A1, incorporated by reference herein in its entirety. Examples of mesh fabric are disclosed in U.S. Pat. Nos. 10,273,608, 6,818,571, and 6,804,978, each of which are incorporated by reference herein in their entirety. Thus, in one or some embodiments, the 3D air mesh layer 1414 may comprise three-dimensional mesh fabric, which may be a special type of knitted spacer fabric, with sandwich structure comprising (or consisting of) two separate meshed multifilament outer layers linked together with a layer of spacer monofilaments.

Figure 14B:
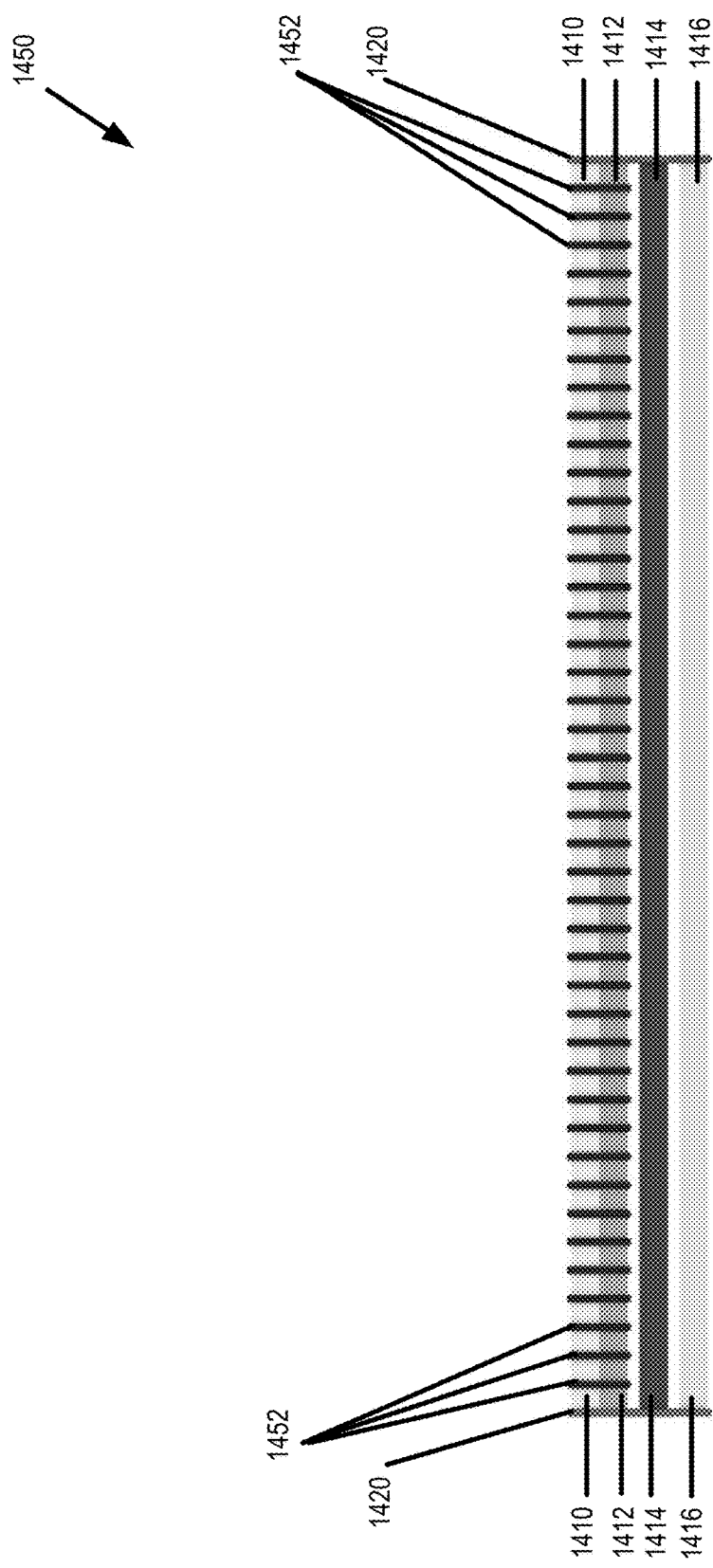
FIG. 14B is a side cross-sectional view of another example of animal bedding illustrating the fleece layer, the absorbent layer, the 3D air mesh layer, and the waterproof layer, with the fleece layer and the absorbent layer (but not the 3D air mesh layer) stitched together so that a pattern is present on the top surface of the fleece layer.

In one or some embodiments, the 3D air mesh layer 1414 may have a thickness that is greater than any one, any combination, or all of fleece layer 1410, absorbent layer 1412, and waterproof layer 1416 (though not as depicted in FIGS. 14A-B). In particular, the 3D air mesh layer 1414 may have a thickness that is at least two times greater than any one, any combination, or all of fleece layer 1410, absorbent layer 1412, and waterproof layer 1416 (e.g., in one embodiment, 3D air mesh layer 1414, having multiple layers of fabric sewn together, may be at least two times thicker than fleece layer 1410 and/or absorbent layer 1412). Alternatively, instead of (or in addition to) 3D air mesh layer 1414, compressible foam may be used.

3D air mesh layer 1414 may result in one or more of the following benefits. First, 3D air mesh layer 1414 may act as a cushion resulting in the animal bedding being softer. In this regard, 3D air mesh layer 1414 is an example of a cushion layer. This may be beneficial in that the animal bedding is more comfortable for guinea pigs and better for the guinea pigs' joints (e.g., more comfortable bedding may be beneficial for older guinea pigs that already suffer from joint problems and for younger guinea pigs to avoid future joint problems). Second, 3D air mesh layer 1414 may provide further rigidity for the animal bedding, so that the animal bedding may keep its shape during washing (e.g., the absorbent layer 1412, which may be composed of bamboo and comprise a bamboo layer or a bamboo blend layer, may tend to shrink; the 3D air mesh layer 1414 may counteract that tendency). Third, cleaning may be easier with 3D air mesh layer 1414. As one example, 3D air mesh layer 1414, with its holes therein, may create an air gap, which may help with the washing and the drying of the absorbent layer 1412. As another example, the air gap created by 3D air mesh layer 1414 may assist in drying of urine (e.g., because of the air gap, urine may dry quicker and may spread better, thereby potentially reducing the smell).

3D air mesh layer 1414 may be connected to any one, any combination, or all of fleece layer 1410, absorbent layer 1412 and waterproof layer 1416 in one of several ways. In one way, stitching 1420 may connect 3D air mesh layer 1414 to all of fleece layer 1410, absorbent layer 1412 and waterproof layer 1416. Alternatively, or in addition, stitching may connect 3D air mesh layer 1414 to one or both of the fleece layer 1410 and the absorbent layer 1412 (FIG. 14A illustrates that stitching 1422 attaches 3D air mesh layer 1414 to both of fleece layer 1410 and absorbent layer 1412; in contrast, FIG. 14B illustrates that stitching 1452 does not attach 3D air mesh layer 1414 to both of fleece layer 1410 and absorbent layer 1412). Further, in one embodiment, a gap is present on one or both sides of 3D air mesh layer 1414 (e.g., FIG. 14A illustrates a gap on a first side of 3D air mesh layer 1414 facing absorbent layer 1412 and on a second side facing waterproof layer 1416). Alternatively, a gap is not present on either side of 3D air mesh layer 1414.

Any one, any combination, or all of the fleece layer 1410, the absorbent layer 1412, the 3D air mesh layer 1414, the waterproof layer 1416 or a pocket (such as illustrated in FIG. 1) may be coated with an antimicrobial agent or solution. As discussed above, guinea pigs may be vulnerable to bacterial infection. As such, an antimicrobial agent may be added to one or more of the layers, such as the absorbent layer 1412 (and potentially to the fleece layer 1410 and/or to the 3D air mesh layer 1414). An example of an antimicrobial agent comprises SILVADUR™ from DuPont. See https://www.dupontnutritionandbiosciences.com/silvadur.html. Other an antimicrobial agents are contemplated. The antimicrobial agent may be applied by padding, exhaustion, printing, or spray application, such as during the manufacture of the absorbent layer 1412.

Waterproof layer 1416 may be waterproof on one or more its sides. In one or some embodiments, waterproof layer 1416 may be waterproof (or water resistant) on only one side, such as by applying a laminate (e.g., PUL) on the side that faces 3D air mesh layer 1414 (whether or not there are intervening layers between 3D air mesh layer 1414 and waterproof layer 1416). Alternatively, waterproof layer 1416 may be waterproof on only two of its sides. In particular, a laminate may be applied to both sides of the waterproof layer 1416, such as the one side facing 3D air mesh layer 1414 and the opposite side (e.g., the side that contacts the ground). Still alternatively, waterproof layer 1416 may be waterproof on all of its sides.

FIG. 14B is a side cross-sectional view 1450 of another example of animal bedding illustrating the fleece layer 1410, the absorbent layer 1412, the 3D air mesh layer 1414, and the waterproof layer 1416, with the fleece layer 1410 and the absorbent layer 1412 (but not the 3D air mesh layer 1414) stitched together with stitching 1452 so that a pattern is present on the top surface of the fleece layer 1410. Thus, FIG. 14B differs from FIG. 14A in that stitching 1422 stitches each of the fleece layer 1410, the absorbent layer 1412, the 3D air mesh layer 1414 together whereas stitching 1452 stitches the fleece layer 1410 and the absorbent layer 1412 together but not the 3D air mesh layer 1414.

Though not illustrated in FIGS. 14A-B, in one or some embodiments, a pocket may be included (such as illustrated in FIG. 1). As discussed above, the pocket may be less than half the surface area of the top layer (such as half the surface of fleece layer 1410). The pocket may be attached to the top layer (such as fleece layer 1410) along one or more side of the pocket (such as along three of the sides of the pocket) via stitching 1420. Alternatively, no pocket is included.

As discussed above, various parts of the animal bedding may be attached together. In one embodiment, the attachment of two parts may be permanent (or semi-permanent) and designed so that the end-user does not detach the two parts. An example of such an attachment comprises stitching. Alternatively, the attachment may comprise a connection device that is composed of two parts and may be designed so that the end-user can detach the two parts and then re-attach the two parts. An example of such an attachment that is a connection device comprises a zipper, clasp snap buttons, or other type of binding device used to bind edges of parts of the animal bedding together. As discussed in more detail below, for cleaning, the end-user may detach the two parts and clean one or both of the parts separately. For example, the animal bedding may be composed (or consist) of a first part and a second part, with the first part and the second part being attached together via a zipper (or the like). In the case of a zipper, the attachment may include two mating pieces, such as a first set of teeth and a second set of teeth that are made to interdigitate thereby linking the first set of teeth with the second set of teeth. In order to bind the first part with the second part using the zipper, the first set of teeth may be sewn into the edge of the first part (such as along an entire perimeter or along substantially the entire perimeter of the edge of the first part) and the second set of teeth may be sewn into the edge of the second part (such as along an entire perimeter or along substantially the entire perimeter of the edge of the second part). In this way, the zipper (which acts as an attachment) is configured to attach the first part to the second part in one configuration such that the first part and the second part are a unitary device (e.g., when the first set of teeth and the second set of teeth interlink) and to detach the first part from the second part in another configuration such that the first part and the second part are disconnected from one another. In this regard, the zipper comprises a different type of attachment than stitching.

Figure 15A:
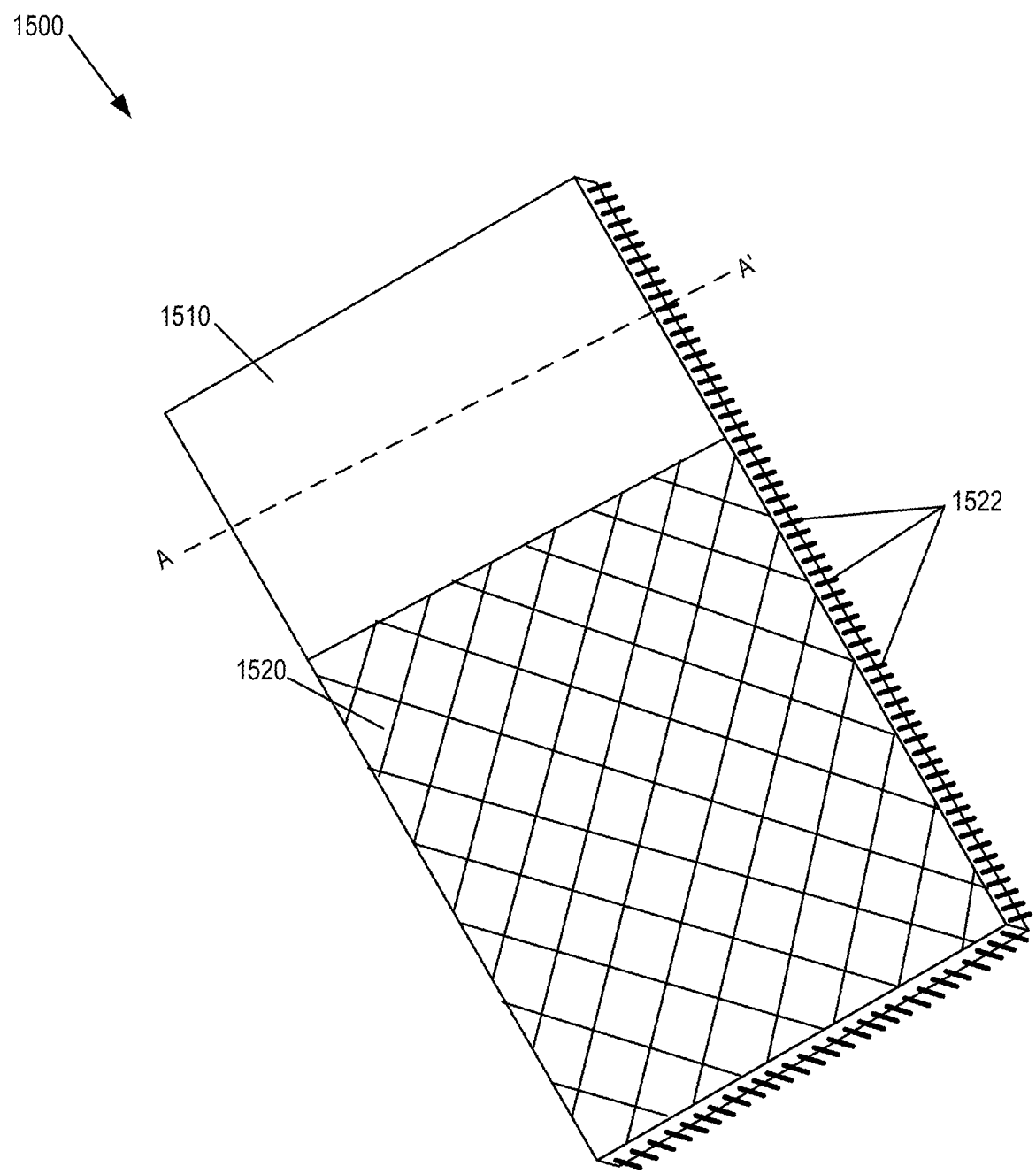
FIG. 15A is a front perspective view of a first part of the animal bedding, with a pocket covering part of the top layer of the first part of the animal bedding, with a set of teeth for one part of a zipper, and with the top layer including a diamond stitching pattern.
Figure 15B:
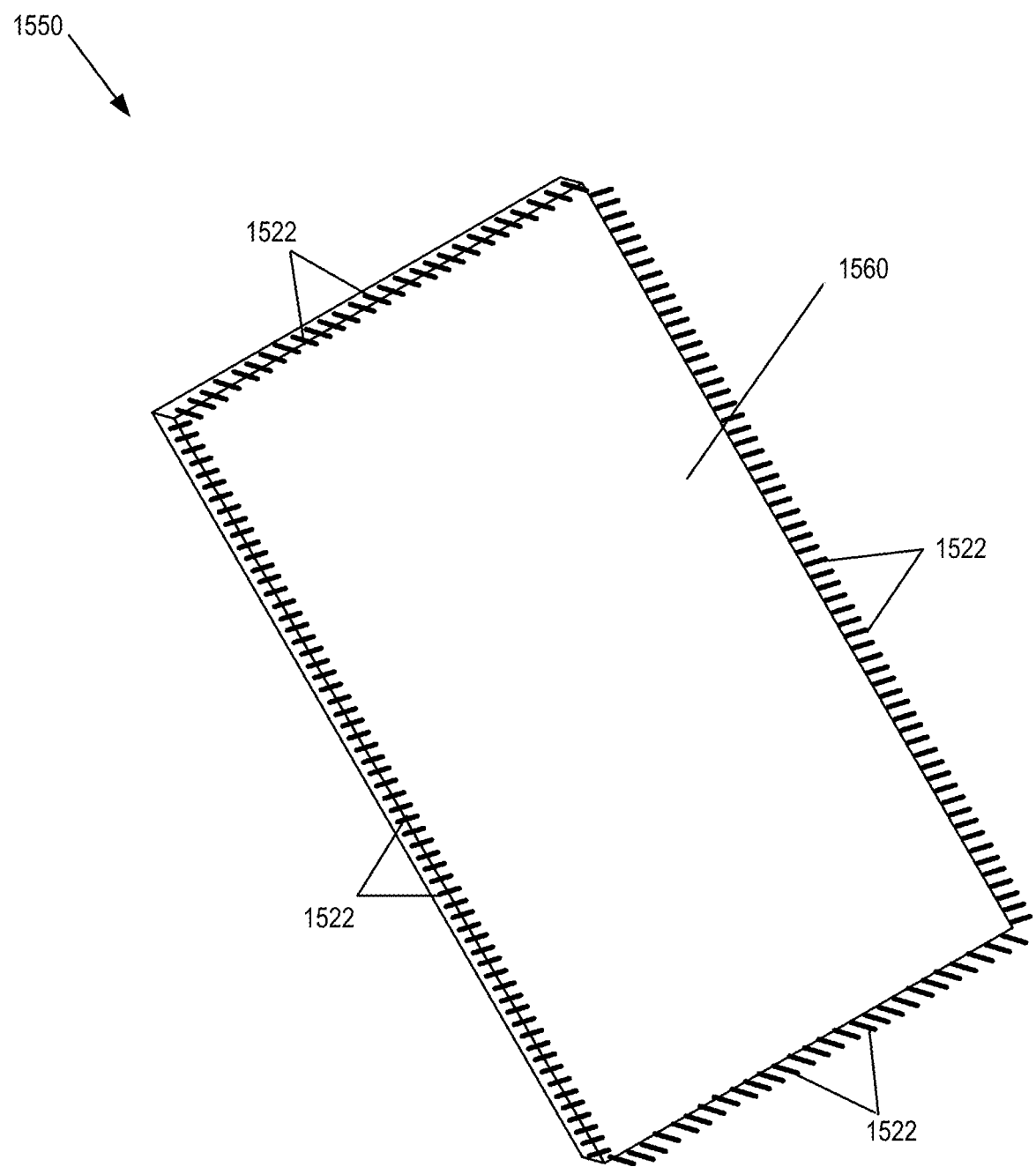
FIG. 15B is a bottom perspective view of the first part of the animal bedding, illustrating the non-waterproof layer and the set of teeth for the one part of a zipper.
Figure 15C:
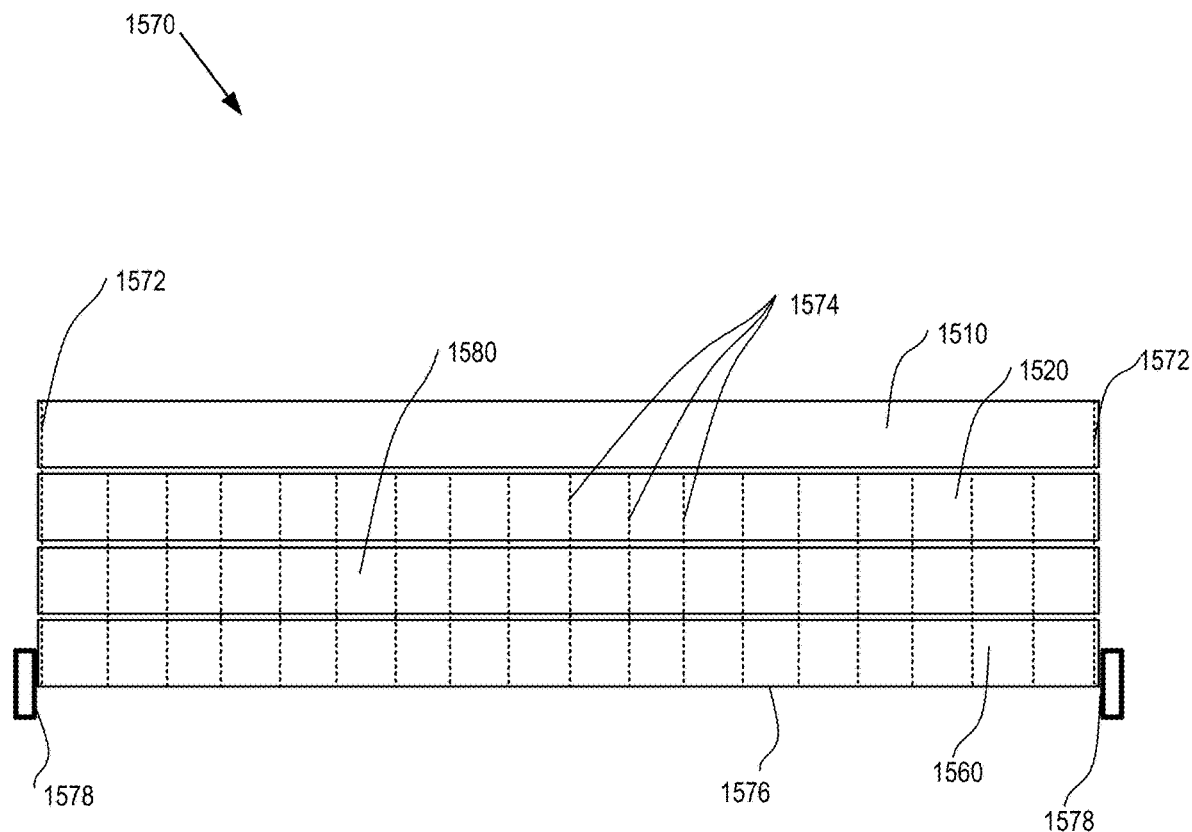
FIG. 15C is one example of a cross-sectional view of A-A' from FIG. 15A.
Figure 15D:
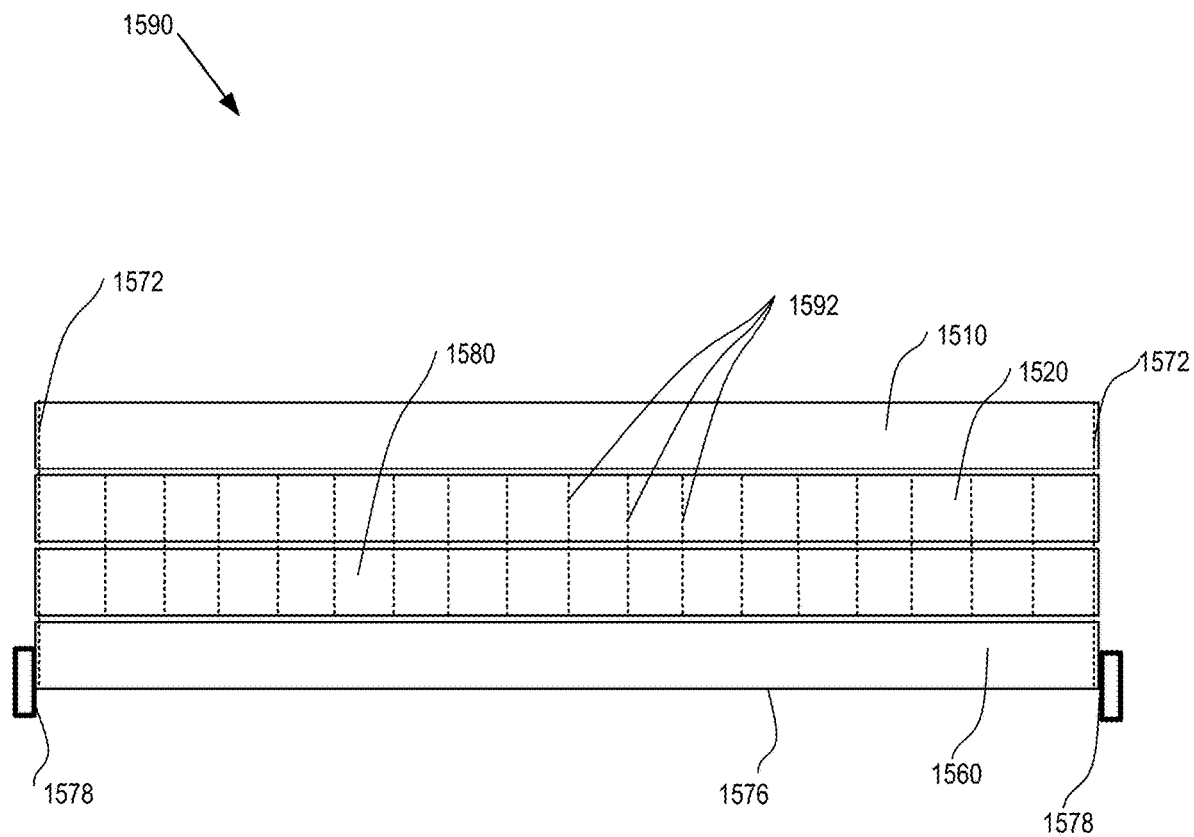
FIG. 15D is another example of a cross-sectional view of A-A' from FIG. 15A.
Figure 16A:
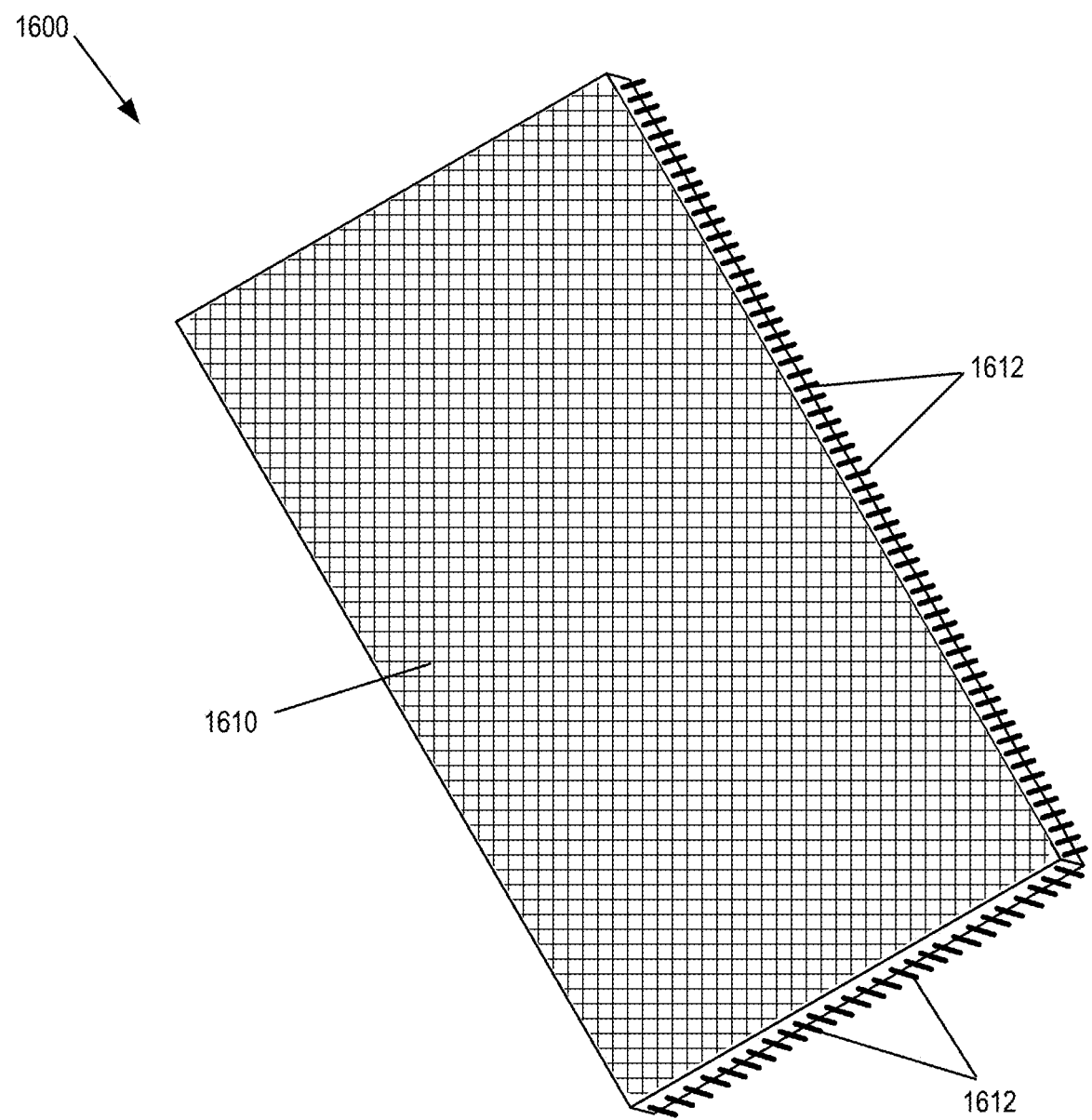
FIG. 16A is a bottom perspective view of a second part of the animal bedding, with a waterproof layer shown, and with a set of teeth for a second part of a zipper designed to mate with the first part of the zipper shown in FIGS. 15A-B.
Figure 16B:
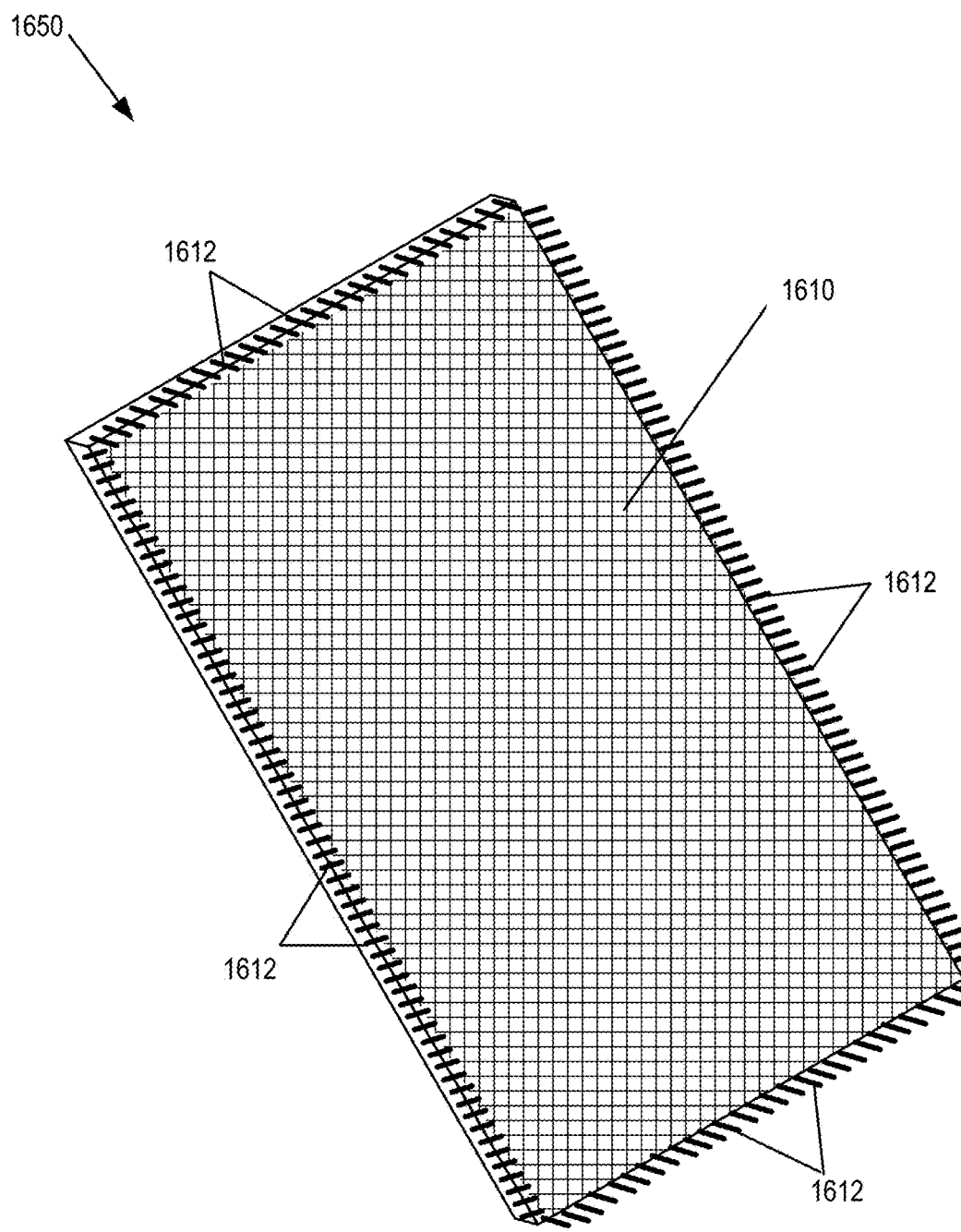
FIG. 16B is a top perspective view of the second part of the animal bedding, illustrating the waterproof layer and the set of teeth for the second part of a zipper.
Figure 17:
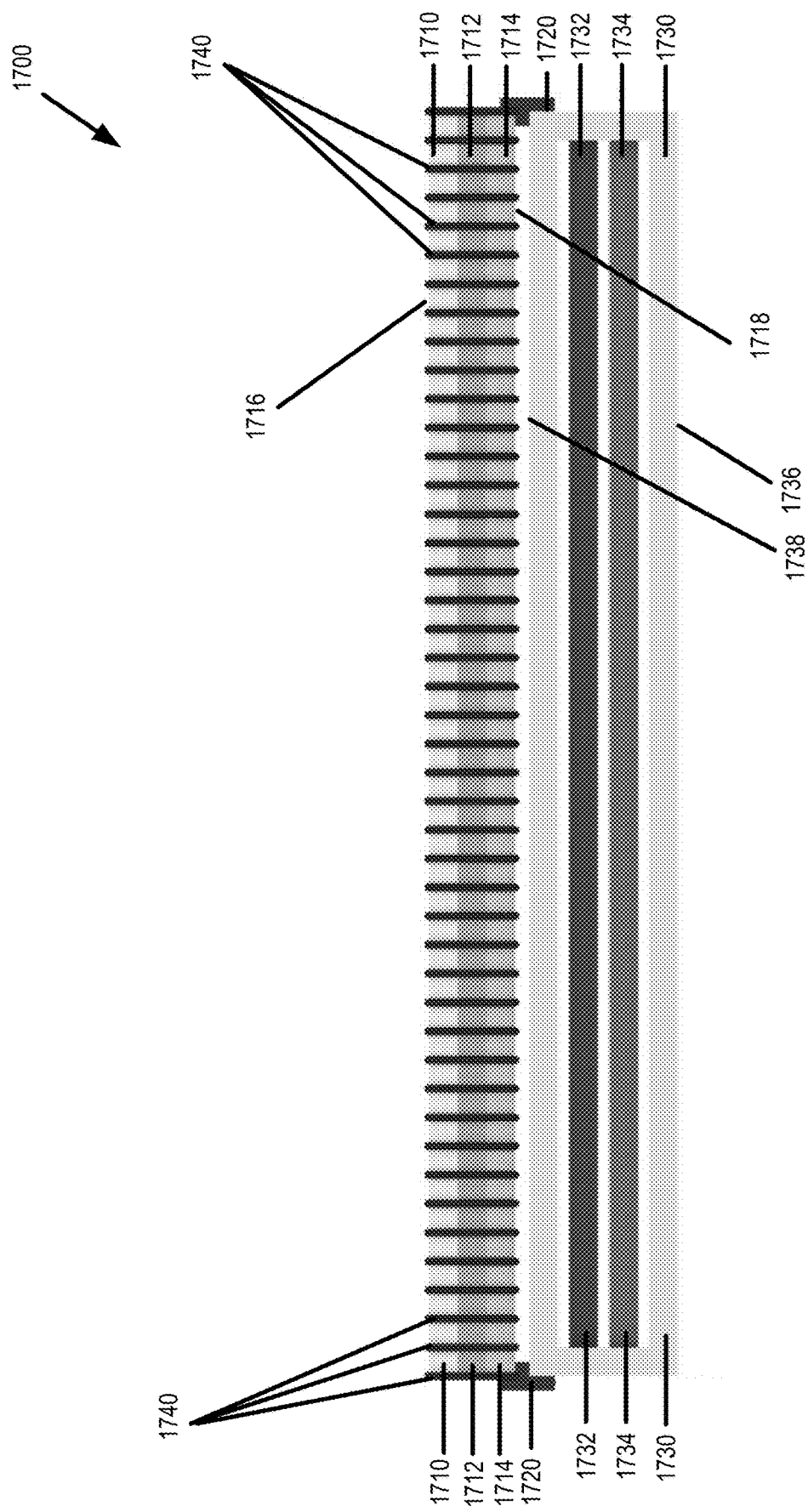
FIG. 17 is a side cross-sectional view of another example of animal bedding with two parts that are connected to one another via a zipper.

FIGS. 15A-17 illustrate various forms of the first part and the second part of the animal bedding, with FIGS. 15A-C illustrating the first part, FIGS. 16A-C illustrating the second part, and FIG. 17 illustrating both the first part and the second part connected to one another. In particular, FIG. 15A is a front perspective view 1500 of a first part of the animal bedding, with a pocket 1510 covering part of the top surface of the top layer 1520 of the first part of the animal bedding (an example of the top surface of the top layer 1520 is shown at 1716 in FIG. 17), with a set of teeth 1522 for one part of a zipper, and with the top layer 1520 including a diamond stitching pattern. Set of teeth 1522 may be connected (e.g., stitched or glued) to one, some or all of the layers of the first part. In practice, the guinea pig may sit on the top surface of the top layer 1520 (e.g., may burrow underneath the pocket 1510 while on the top surface of the top layer 1520). An example of the top layer 1520 is fleece layer 1710, discussed below with regard to FIG. 17.

FIG. 15B is a bottom perspective view 1550 of the first part of the animal bedding, illustrating a bottom surface of the protective layer 1560 (an example of the bottom surface of the protective layer 1560 is surface 1718 of non-waterproof layer 1714 in FIG. 17) and the set of teeth 1522 for the one part of a zipper. An example of the protective layer 1560 is non-waterproof layer 1714, discussed below with regard to FIG. 17.

FIG. 15C is one example of a cross-sectional view 1570 of A-A' from FIG. 15A. Pocket 1510 may be attached to top layer 1520. As shown in FIG. 15C, pocket 1510 is attached to each of top layer 1520, absorbent layer 1580, and protective layer 1560 via stitching 1572. Alternatively, pocket 1510 is not included. In one embodiment, even without pocket 1510, stitching 1572 is used to attach each of each of top layer 1520, absorbent layer 1580, and protective layer 1560 together. Alternatively, without pocket 1510, stitching is not included as well. Separately, top layer 1520 and one or both of absorbent layer 1580 and protective layer 1560 may be connected via stitching. For example, each of top layer 1520, absorbent layer 1580, and protective layer 1560 may be connected via stitching 1574 (as illustrated in FIG. 15C), which may be separate from stitching 1572. Further, protective layer 1560 includes bottom surface 1576, which may face the second part of the animal bedding when connected via zipper 1578. Zipper 1578 may be attached to the animal bedding in one or more places, such as to any one, any combination, or all of top layer 1520, the absorbent layer 1580, or the protective layer 1560. As shown in FIG. 15C, zipper 1578 is attached to the protective layer 1560. The attachment of the zipper 1578 to any one, any combination, or all of top layer 1520, the absorbent layer 1580, or the protective layer 1560 may be in one of several ways, such as via glue, heat bonding, and/or stitching.

FIG. 15D is another example of a cross-sectional view 1590 of A-A' from FIG. 15A. In contrast to FIG. 15C, top layer 1520 is connected to absorbent layer 1580 but not to protective layer 1560 via stitching 1992.

FIG. 16A is a bottom perspective view 1600 of a second part of the animal bedding, with a bottom surface of the waterproof layer 1610 shown (an example of the surface of the waterproof layer 1610 is surface 1736 of waterproof layer 1730 in FIG. 17), and with a set of teeth 1612 for a second part of a zipper designed to mate with the first part of the zipper shown in FIGS. 15A-B (e.g., set of teeth 1522 interlock with set of teeth 1612). Set of teeth 1612 may be connected (e.g., stitched or glued) to one, some or all of the layers of the second part. In one embodiment, waterproof layer 1610 includes multiple levels, such as illustrated in FIG. 17. Alternatively, waterproof layer 1610 includes a single level.

As shown, both set of teeth 1522 of the first part and set of teeth 1612 of the second part are entirely around (or substantially entirely around) a perimeter of each of the first part and the second part. FIG. 16B is a top perspective view 1650 of the second part of the animal bedding, illustrating the top surface of the waterproof layer 1610 (an example of the top surface of the waterproof layer 1610 is surface 1738 of waterproof layer 1730 in FIG. 17) and the set of teeth 1612 for the second part of a zipper. It is noted that the waterproof layer illustrated in FIGS. 16A-B may comprise a multi-leveled structure, such as illustrated by waterproof layer 1730 in FIG. 17 inside which resides a cavity. Alternatively, waterproof layer illustrated in FIGS. 16A-B may comprise a single-level structure (such as illustrated by bottom layer 140 in FIG. 8). In this regard, any discussion regarding a layer may comprise a single-level structure or multi-level structure.

FIG. 17 is a side cross-sectional view of another example of animal bedding 1700 with two parts that are connected to one another via a zipper 1720. The first part comprises fleece layer 1710, absorbent layer 1712, non-waterproof layer 1714, and the first part of zipper 1720 (e.g., first set of teeth for the zipper 1720). The second part comprises waterproof layer 1730, cushion layer 1732, plastic board 1734, and second part of zipper 1720 (e.g., the second set of teeth designed to interlock with the first set of teeth for the zipper 1720). Thus, the absorbent layer 1712, which may comprise bamboo or a bamboo blend, of the first part may be separated from the second part, such as from the waterproof layer 1730 of the second part via one or more layers, such as non-waterproof layer 1714.

Plastic board 1734 may be composed of any type of plastic, such as synthetic or semi-synthetic materials that use polymers as an ingredient (such as a main ingredient). Merely by way of example, plastic board 1734 may be composed of polyethylene.

As discussed above, a cushion layer (an example of which is 3D air mesh layer 1414) may be used so that the animal bedding may be more comfortable for guinea pigs and may be better for the guinea pigs' joints. One example is cushion layer 1732. Various examples of cushion layer 1732 are contemplated. As one example, cushion layer 1732 may comprise the 3D air mesh layer 1414 discussed above. Alternatively, or in addition, cushion layer 1732 may comprise one or more sponges (or one or more sponge layers), which may fill the cavity (apart from plastic board 1734 inserted therein). In one embodiment, a first sponge is placed on top of a second sponge, with at least one aspect of the first sponge being different from the second sponges. As one example, the first sponge may be any one, any combination, or all of softer, less dense, or less firm than the second sponge. In particular, the first sponge may comprise a Polyurethane (PU) foam and the second sponge may comprise a Polyethylene (PE) foam. In this way, the cushion layer 1732 may provide for shock absorbency for the animal.

As shown in FIG. 17, the cushion layer 1732 is positioned above plastic board 1734. Alternatively, cushion layers may be on either side of plastic board 1734, such as directly above and/or directly below plastic board 1734, or above plastic board 1734 (with one or more intermediate layers) and/or below plastic board 1734 (with one or more intermediate layers). Cushion layer 1732 is different from plastic board 1734 in one or more aspects, such as in rigidity with plastic board 1734 being more rigid than cushion layer 1732 (e.g., cushion layer 1732 has more flexibility than plastic board 1734).

In one or some embodiments, waterproof layer 1730 comprises a multi-level structure and at least partly encircles one or both of cushion layer 1732 and plastic board 1734. For example, waterproof layer 1730 may encircle at least on two sides of one or both of cushion layer 1732 and plastic board 1734, at least on three sides of one or both of cushion layer 1732 and plastic board 1734, or entirely encircle on all four sides of one or both of cushion layer 1732 and plastic board 1734.

In particular, waterproof layer 1730 may comprise multiple levels to form a cavity contained therein. The cavity of the waterproof layer 1730 may include one or more internal cavity layers, such as a first interior cavity layer and a second interior cavity layer. In one or some embodiments, after inserting cushion layer 1732 and plastic board 1734 in the cavity (both of which may act as interior cavity layers), waterproof layer 1730 may be permanently sealed (e.g., by applying heat to melt the opening of the waterproof layer 1730 through which cushion layer 1732 and plastic board 1734 were inserted) such that no water may enter therein after permanent sealing. Alternatively, after inserting cushion layer 1732 and plastic board 1734 in the cavity, waterproof layer 1730 may be temporarily sealed (e.g., via a zipper closing the opening of the waterproof layer through which cushion layer 1732 and plastic board 1734 were inserted) such that no water may enter therein after temporary sealing. In one or some embodiments, one or both of cushion layer 1732 and plastic board 1734 are at least ¼ inch, at least ⅓ inch, or at least ½ inch. Thus, in one or some embodiments, the second part, which includes waterproof layer 1730, cushion layer 1732 and plastic board 1734, may comprise a plastic mat with a cushion and/or rigid layer therein.

As discussed above, one or more of the layers may be used to absorb liquid, such as urine. For example, absorbent layer 1712, which may be composed of bamboo or a bamboo blend, may be used to absorb the liquid. However, when washing the animal bedding, such as washing in a washing machine, shrinkage of the layer(s), such as shrinkage of the absorbent layer 1412, 1712, may occur. In order to reduce the potential for shrinkage, various types of animal bedding may be used in which one or more layers may be used as a protective layer to reduce shrinkage and/or to better maintain the shape of the animal bedding. In one or some embodiments, this protective layer may be in the form of a 3D mesh, such as 3D air mesh layer 1414, whereby the rigidity of the 3D air mesh layer 1414 may maintain or stretch the absorbent layer, thereby reducing shrinkage.

Alternatively, or in addition, this protective layer may be in the form of non-waterproof layer 1714. As mentioned above, shrinkage may occur during washing. In that regard, prior to washing the animal bedding, such as animal bedding 1700, the animal bedding may be separated into the two separate parts (e.g., unzipping the animal bedding so that the first part and the second part are no longer connected). In this way, the first part and the second part may be reversibly attached and detached, with detaching allowing the first part and the second part to be cleaned separately and in different ways. For example, first part (illustrated in FIGS. 15A-B) may be cleaned in a washing machine, whereas second part (illustrated in FIGS. 16A-B) may be cleaned by wiping down the waterproof layer 1610 by hand with a disinfectant. Further, first part may likely need to be cleaned more often since it will become dirtier with urine/feces than second part. Therefore, first part alone may be cleaned more often than the second part, reducing wear on the second part. Because of this, the second part may be cleaned less than the first part, thereby lasting longer. Further, the animal bedding may last longer by only purchasing a new first part (after the original first part wears out from washing) without needing to purchase the second part, thereby being more ecologically friendly. In addition, because the first part is detached from the second part while cleaning, the first part may dry more quickly after removal from the washing machine. Finally, to the extent the first part may shrink from washing, when reattaching the second part to the first part (e.g., reconnecting the first part to the second part via the zipper), the second part, with the rigidity of plastic board 1734, may stretch the first part to the extent any layer of the first part (such as absorbent layer 1712) may have shrunk.

As discussed above, a protective layer, such as non-waterproof layer 1714, may be used to protect the absorbent layer 1712. The protective layer may abut absorbent layer 1712 on one side (such as illustrated in FIG. 17). Alternatively, one or more intermediate layers may be in between the protective layer and the absorbent layer 1712.

The non-waterproof layer 1714 may be composed of any one or both of polyester (or other synthetic fiber) or cotton. For example, in one embodiment, the non-waterproof layer may comprise a thin cotton fabric, such as a thin fleece made with or without cotton. In particular, the thin fleece may have a lower gsm, such as less than 100 gsm, less than 200 gsm, or the like.

The protective layer may assist both when the first part and the second part are attached to one another and when the first part is detached from the second part. When the first part and the second part are connected, even if the absorbent layer 1712 absorbs liquid, the protective layer may also be able to transmit liquids, such as urine, that passes from the absorbent layer 1712 so that the liquid sits on top of the waterproof layer 1730. When the first part and the second part are disconnected in order to wash the first part, the protective layer (e.g., the non-waterproof layer 1714) may protect the absorbent layer 1712 during the washing and/or drying process. The absorbent layer 1712 may include batting, so that without the non-waterproof layer 1714 as protection, the absorbent layer 1712 may be damaged in the washing process.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. Animal bedding comprising:
    an upper layer;
    at least one middle layer, the at least one middle layer being at least partly absorbent of liquid or at least partly composed of a synthetic material; and
    a lower layer, wherein at least a part of the lower layer is hydrophobic;
    wherein the at least one middle layer is between the upper layer and the lower layer;
    wherein a first attachment attaches the upper layer to the lower layer, the first attachment being formed at least partly around a periphery of the upper layer and at least partly around a periphery of the lower layer; and
    wherein a second attachment attaches the upper layer to the at least one middle layer, wherein the second attachment is separate from the first attachment, the second attachment comprises stitching together the upper layer with the at least one middle layer but not the lower layer such that the stitching forms a pattern on a surface of the upper layer interior to the periphery of the upper layer.

2. The animal bedding of claim 1, wherein the upper layer comprises a hydrophobic material.

3. The animal bedding of claim 1, wherein at least one surface of the lower layer is hydrophobic.

4. The animal bedding of claim 3, wherein, when the first attachment attaches the upper layer to the lower layer, a surface of the lower layer closer to the at least one middle layer is hydrophobic.

5. The animal bedding of claim 1, further comprising a pocket, wherein the pocket is attached to the upper layer, the pocket covering less than half of a surface area of the upper layer.

6. The animal bedding of claim 5, wherein the pocket is attached to the upper layer via the first attachment.

7. The animal bedding, wherein the upper layer comprises a top layer; and
wherein the lower layer comprises a bottom layer.

8. The animal bedding, wherein the at least one middle layer comprises a cellulose-based material.

9. Animal bedding, comprising:
an upper layer;
at least one middle layer, wherein the at least one middle layer comprises a less rigid layer that is at least partly absorbent of liquid or at least partly composed of a synthetic material; and a more rigid layer, the more rigid layer being more rigid than the less rigid layer; and
a lower layer, wherein at least a part of the lower layer is hydrophobic;
wherein the less rigid layer and the more rigid layer are between the upper layer and the lower layer;
wherein a first attachment attaches the upper layer to the lower layer;
wherein a second attachment attaches the upper layer to the at least one middle layer; and
wherein the second attachment is separate from the first attachment.

10. The animal bedding of claim 9, wherein the second attachment comprises stitching; and
wherein the stitching attaches the upper layer, the less rigid layer, and the more rigid layer together.

11. The animal bedding of claim 9, wherein the second attachment comprises stitching; and
wherein the stitching attaches the upper layer and the less rigid layer together but does not attach the more rigid layer to the upper layer or to the less rigid layer.

12. The animal bedding of claim 9, wherein the more rigid layer comprises a 3D air mesh layer.

13. The animal bedding of claim 9, wherein the first attachment is formed at least partly around a periphery of the upper layer and at least partly around a periphery of the lower layer; and
wherein the second attachment comprises stitching together the upper layer with the less rigid layer such that the stitching forms a pattern on a surface of the upper layer interior to the periphery of the upper layer.

14. The animal bedding of claim 13, wherein the stitching of the upper layer and the less rigid layer together results in quilting of the surface of the upper layer; and
wherein the stitching does not stitch the lower layer.

15. Animal bedding, comprising:
an upper layer;
at least one middle layer, the at least one middle layer comprising a hydrophilic material, wherein the at least one middle layer comprises bamboo; and
a lower layer, wherein at least a part of the lower layer is hydrophobic;
wherein a first attachment attaches the upper layer to the lower layer; and
wherein a second attachment attaches the upper layer to the at least one middle layer, wherein the second attachment is separate from the first attachment.

16. The animal bedding of claim 15, wherein the at least one middle layer comprises:
a bamboo blend layer consists of a bamboo blend of the bamboo and a synthetic material; and
a more rigid layer, the more rigid layer being more rigid than the bamboo blend layer.

17. The animal bedding of claim 15, wherein the at least one middle layer comprising the bamboo includes an antimicrobial solution applied thereto.

18. Animal bedding, comprising:
an upper layer;
at least one middle layer, the at least one middle layer being at least partly absorbent or at least partly composed of a synthetic material; and
a lower layer, wherein at least a part of the lower layer is hydrophobic;
wherein a first attachment attaches the upper layer to the lower layer;
wherein a second attachment attaches the upper layer to the at least one middle layer, wherein the second attachment is separate from the first attachment;
wherein the upper layer and the at least one middle layer comprises a first part;
wherein the lower layer comprises a second part; and
wherein the first part and the second part are attached to each other via the first attachment, the first attachment being configured to attach the first part to the second part in one configuration such that the first part and the second part are a unitary device and to detach the first part from the second part in another configuration such that the first part and the second part are disconnected from one another.

19. The animal bedding of claim 18, wherein the first attachment comprises a zipper that includes a first set of teeth and a second set of teeth such that the first set of teeth and the second set of teeth interlink with one another;
wherein the first part includes the first set of teeth along at least a part of a periphery of the first part; and
wherein the second part includes the second set of teeth along at least a part of a periphery of the second part.

20. The animal bedding of claim 19, wherein the first set of teeth are positioned along an entire periphery of the first part; and
wherein the second set of teeth are positioned along an entire periphery of the second part.

21. The animal bedding of claim 18, wherein the lower layer of the second part comprises an entirely encircled waterproof layer within which resides a cavity; and
wherein one or more layers are positioned within the cavity of the encircled waterproof layer.

22. The animal bedding of claim 21, wherein the one or more layers positioned within the cavity comprises a first interior cavity layer and a second interior cavity layer, wherein the second interior cavity layer is more rigid than the first interior cavity layer.

23. The animal bedding of claim 22, wherein the first interior cavity layer comprises one or more sponge layers; and
wherein the second interior cavity layer comprises rigid plastic that is more rigid than the one or more sponge layers.

24. The animal bedding of claim 18, wherein the first part comprises the upper layer, an absorbent layer, and a protective layer, wherein the absorbent layer is sandwiched between the upper layer and the protective layer such that when the first part and the second part are detached from each other, the protective layer is configured to protect the absorbent layer.

25. The animal bedding of claim 24, wherein the second attachment comprises stitching which stitches the upper layer, the absorbent layer, and the protective layer together with the stitching forming a pattern on a surface of the upper layer.

26. The animal bedding of claim 24, wherein the protective layer comprises a non-waterproof layer.

27. Animal bedding comprising:
an upper layer;
a middle layer;
a protective layer, wherein the middle layer is between the upper layer and the protective layer;
a connection device as part of a first type of attachment, the connection device attached to at least one of the upper layer, the middle layer, or the protective layer and configured to mate with a corresponding connection device on a second part, the second part comprising a waterproof layer, wherein the first type of attachment is configured to reversibly attach to and detach from the second part; and
a second type of attachment that attaches the upper layer to the middle layer, the second type of attachment being of a different type than the first type of attachment wherein the second type of attachment comprises stitching.

28. The animal bedding of claim 27, wherein the first type of attachment comprises a zipper with the connection device comprising a set of teeth configured to mate with a corresponding set of teeth on the second part.

29. The animal bedding of claim 27, wherein the stitching for the second type of attachment stitches the upper layer, the middle layer, and the protective layer together.

30. The animal bedding of claim 29, wherein the protective layer comprises a non-waterproof layer.

31. The animal bedding of claim 30, wherein the first type of attachment comprises a zipper with the connection device comprising a set of teeth configured to mate with a corresponding set of teeth on the second part; and
wherein the set of teeth are positioned along at least a part of a periphery of the at least one of the upper layer, the middle layer, or the protective layer.

32. The animal bedding of claim 31, wherein the set of teeth are positioned along an entirety of the periphery of the at least one of the upper layer, the middle layer, or the protective layer.

33. The animal bedding of claim 27, wherein the first type of attachment comprises a plurality of buttons.

34. The animal bedding of claim 27, wherein the middle layer comprises an absorbent layer.

35. The animal bedding of claim 27, wherein the middle layer is at least partly composed of a synthetic material.

* * * * *

UNITED STATES PATENT AND TRADEMARK OFFICE
CERTIFICATE OF CORRECTION

| | | |
|---|---|---|
| PATENT NO. | : 11,129,357 B1 | Page 1 of 1 |
| APPLICATION NO. | : 17/222446 | |
| DATED | : September 28, 2021 | |
| INVENTOR(S) | : Lee et al. | |

It is certified that error appears in the above-identified patent and that said Letters Patent is hereby corrected as shown below:

In the Claims

Claim 7 (Column 17, Line 7):
THE ANIMAL BEDDING, WHEREIN
Should be replaced with:
--The animal bedding of claim 1, wherein--

Claim 8 (Column 17, Line 11):
THE ANIMAL BEDDING, WHEREIN
Should be replaced with:
--The animal bedding of claim 1, wherein--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*